United States Patent
Uchiyama et al.

(10) Patent No.: US 12,089,248 B2
(45) Date of Patent: Sep. 10, 2024

(54) COMMUNICATION DEVICE

(71) Applicant: Sony Corporation, Tokyo (JP)

(72) Inventors: Hiromasa Uchiyama, Tokyo (JP); Naoki Kusashima, Tokyo (JP); Hiroki Matsuda, Tokyo (JP); Yifu Tang, Tokyo (JP)

(73) Assignee: SONY CORPORATION, Tokyo (JP)

( * ) Notice: Subject to any disclaimer, the term of this patent is extended or adjusted under 35 U.S.C. 154(b) by 695 days.

(21) Appl. No.: 17/263,918

(22) PCT Filed: Jul. 9, 2019

(86) PCT No.: PCT/JP2019/027230
§ 371 (c)(1),
(2) Date: Jan. 28, 2021

(87) PCT Pub. No.: WO2020/031593
PCT Pub. Date: Feb. 13, 2020

(65) Prior Publication Data
US 2021/0307029 A1     Sep. 30, 2021

(30) Foreign Application Priority Data

Aug. 8, 2018   (JP) ................................. 2018-149092

(51) Int. Cl.
*H04W 72/566*   (2023.01)
*H04W 4/40*     (2018.01)
*H04W 76/14*    (2018.01)

(52) U.S. Cl.
CPC ......... *H04W 72/566* (2023.01); *H04W 76/14* (2018.02); *H04W 4/40* (2018.02)

(58) Field of Classification Search
CPC ..... H04W 76/23; H04W 4/70; H04W 72/566; H04W 76/14; H04W 72/0446; H04W 72/569; H04W 4/40
See application file for complete search history.

(56) References Cited

U.S. PATENT DOCUMENTS 9,552,727 B2 * 1/2017 Rubin ...................... G08G 1/16
10,292,136 B2 * 5/2019 Rubin ...................... H04W 4/12
(Continued)

FOREIGN PATENT DOCUMENTS

CN          105766030 A      7/2016
CN          108028743 A      5/2018
(Continued)

OTHER PUBLICATIONS

Lenovo et al: "Connection establishment for Unicast in NR V2X",3GPP Draft. R2-1817117 Connection Establishment for Unicast in NR V2X, 3rd Generation Partnership Project (3GPP),Mobile Competence Centre : 650. Route Deslucioles : F-06921 Sophia Antipolis Cede vo l. RAN WG2, No. Spokane, USA: Nov. 12, 2018-Nov. 16, 2018 Nov. 12, 2018(Nov. 12, 2018).XP051556661 .Retrieved from the Internet :URL:http://www.3gpp.org/ftp/meetings%5F3GPP%5FSYNC/RAN2/Docs/R2%2D1817117%2Ezip[ retrieved on Nov. 12, 2018].

(Continued)

*Primary Examiner* — Mehmood B. Khan
(74) *Attorney, Agent, or Firm* — XSENSUS LLP

(57) ABSTRACT

It is possible to further suppress emergence of a half duplex (HD) problem in inter-device communication such as V2X communication. A communication device includes: a communication unit (220) that performs wireless communication; an acquisition unit (243) that acquires first information from a first communication device via the wireless communication, the first information being information regarding a transmission condition of data using a communication mode of switching transmission and reception in a time division manner to perform the inter-device communication; and a control unit (241) that controls an operation related to reception of data transmitted from the first communication device according to the first information.

9 Claims, 26 Drawing Sheets

(56) References Cited

U.S. PATENT DOCUMENTS

| | | | |
|---|---|---|---|
| 11,218,216 B2* | 1/2022 | Uchiyama | H04B 7/2606 |
| 2017/0013648 A1* | 1/2017 | Jung | H04W 76/14 |
| 2017/0332213 A1 | 11/2017 | Xu | |
| 2018/0206260 A1* | 7/2018 | Khoryaev | H04W 72/56 |
| 2018/0255563 A1 | 9/2018 | Chen et al. | |
| 2019/0230723 A1* | 7/2019 | Kim | H04W 76/12 |
| 2019/0306923 A1* | 10/2019 | Xiong | H04J 13/0062 |
| 2019/0364492 A1* | 11/2019 | Azizi | H04W 52/0264 |
| 2020/0092685 A1* | 3/2020 | Fehrenbach | H04W 76/14 |
| 2020/0389469 A1* | 12/2020 | Litichever | H04W 4/40 |
| 2021/0153065 A1* | 5/2021 | Adjakple | H04W 80/02 |
| 2021/0176735 A1* | 6/2021 | Deng | H04W 72/0453 |
| 2021/0219320 A1* | 7/2021 | Belleschi | H04W 72/20 |
| 2021/0314962 A1* | 10/2021 | Ashraf | H04B 17/309 |
| 2021/0329596 A1* | 10/2021 | Freda | H04W 72/542 |
| 2021/0385694 A1* | 12/2021 | Freda | H04W 28/0268 |

FOREIGN PATENT DOCUMENTS

| | | | |
|---|---|---|---|
| CN | 108370566 A | 8/2018 | |
| EP | 3343995 A | 7/2018 | |
| EP | 3343995 A1 * | 7/2018 | H04L 5/0069 |
| JP | 2017-208796 A | 11/2017 | |
| WO | 2017/034324 A1 | 3/2017 | |
| WO | WO-2017077625 A1 * | 5/2017 | H04W 4/46 |
| WO | WO-2017169111 A1 | 10/2017 | |
| WO | WO-2017195535 A1 | 11/2017 | |
| WO | WO-2018027528 A1 | 2/2018 | |

OTHER PUBLICATIONS

Qualcomm Incorporated: "Unicast and multicast V2X communication support over PC5": 3GPP Draft, S2-183620; Sanya. P.R. China: Apr. 10, 2018 (Apr. 10, 2018); XP051437921; Retrieved from the Internet. URL: http://www.3gpp.org/ftp/tsg%5Fsa/WG2%5FArch/TSGS2%5F127%5FSanya/Docs/ [retrieved on Apr. 10, 2018].

International Search Report and Written Opinion mailed on Aug. 6, 2019, received for PCT Application PCT/JP2019/027230, Filed on Jul. 9, 2019, 11 pages including English Translation.

Huawei et al., "Priority Handling Based on ProSe Per Packet Priority", 3GPP TSG-RAN WG2 Meeting # 92, R2-156533, Nov. 16-20, 2015, 6 pages.

* cited by examiner

COMMUNICATION DEVICE

CROSS-REFERENCE TO RELATED APPLICATIONS

The present application is based on PCT filing PCT/JP2019/027230, filed Jul. 9, 2019, which claims priority to JP 2018-149092, filed Aug. 8, 2018, the entire contents of each are incorporated herein by its reference.

TECHNICAL FIELD

The present disclosure relates to a communication device.

BACKGROUND ART

In order to realize future autonomous driving, an expectation for in-vehicle communication (V2X communication) has increased in recent years. The V2X communication is an abbreviation for Vehicle to X communication, and is a system in which "something" performs communication with a vehicle. Examples of "something" here include a vehicle, an infrastructure, a network, and a pedestrian, and the like (V2V, V2I, V2N, and V2P). For example, Patent Document 1 discloses an example of a technology related to V2X communication.

Furthermore, as wireless communication for a vehicle, 802.11p-based dedicated short range communication (DSRC) has been mainly developed, but in recent years, standardization of "long term evolution (LTE)-based V2X", which is LTE-based in-vehicle communication, has been performed. In the LTE-based V2X communication, an exchange of a basic safety message and the like is supported.

CITATION LIST

Patent Document

Patent Document 1: Japanese Patent Application Laid-Open No. 2017-208796

SUMMARY OF THE INVENTION

Problems to be Solved by the Invention

By the way, in inter-device communication typified by V2X communication in a sidelink, there may be a restriction called a so-called half duplex (HD) that transmission and reception are limited to being performed in a time division manner, such that the transmission or the reception cannot be always performed. Due to such a restriction of the HD, even in conventional LTE-V2X communication that supports repetition transmission of broadcast communication, there was a case where a so-called HD problem in which transmission or reception is restricted occurs.

On the other hand, in new radio (NR) V2X communication, unicast communication whose amount of communication data is larger than that of broadcast communication is supported. Against this background, there is a possibility that the HD problem will more significantly emerge in the NR V2X communication than in the conventional V2X communication.

Therefore, the present disclosure proposes a technology capable of further suppressing emergence of an HD problem in inter-device communication such as V2X communication.

Solutions to Problems

According to the present disclosure, there is provided a communication device including: a communication unit that performs wireless communication; an acquisition unit that acquires first information from a first communication device via the wireless communication, the first information being information regarding a transmission condition of data using a communication mode of switching transmission and reception in a time division manner to perform the inter-device communication; and a control unit that controls an operation related to reception of data transmitted from the first communication device according to the first information.

Furthermore, according to the present disclosure, there is provided a communication device including: a communication unit that performs wireless communication; a notification unit that notifies a third communication device of first information via the wireless communication, the first information being information regarding a transmission condition of data using a communication mode of switching transmission and reception in a time division manner to perform the inter-device communication; and a control unit that controls an operation related to transmission of data to the third communication device after the notification of the first information.

Effects of the Invention

As described above, according to the present disclosure, a technology capable of further suppressing emergence of an HD problem in inter-device communication such as V2X communication is provided.

Note that the effect described above is not necessarily restrictive, and any effect set forth in the present specification or other effects that can be grasped from the present specification may be accomplished together with or instead of the effect described above.

MODE FOR CARRYING OUT THE INVENTION

Figure 1:
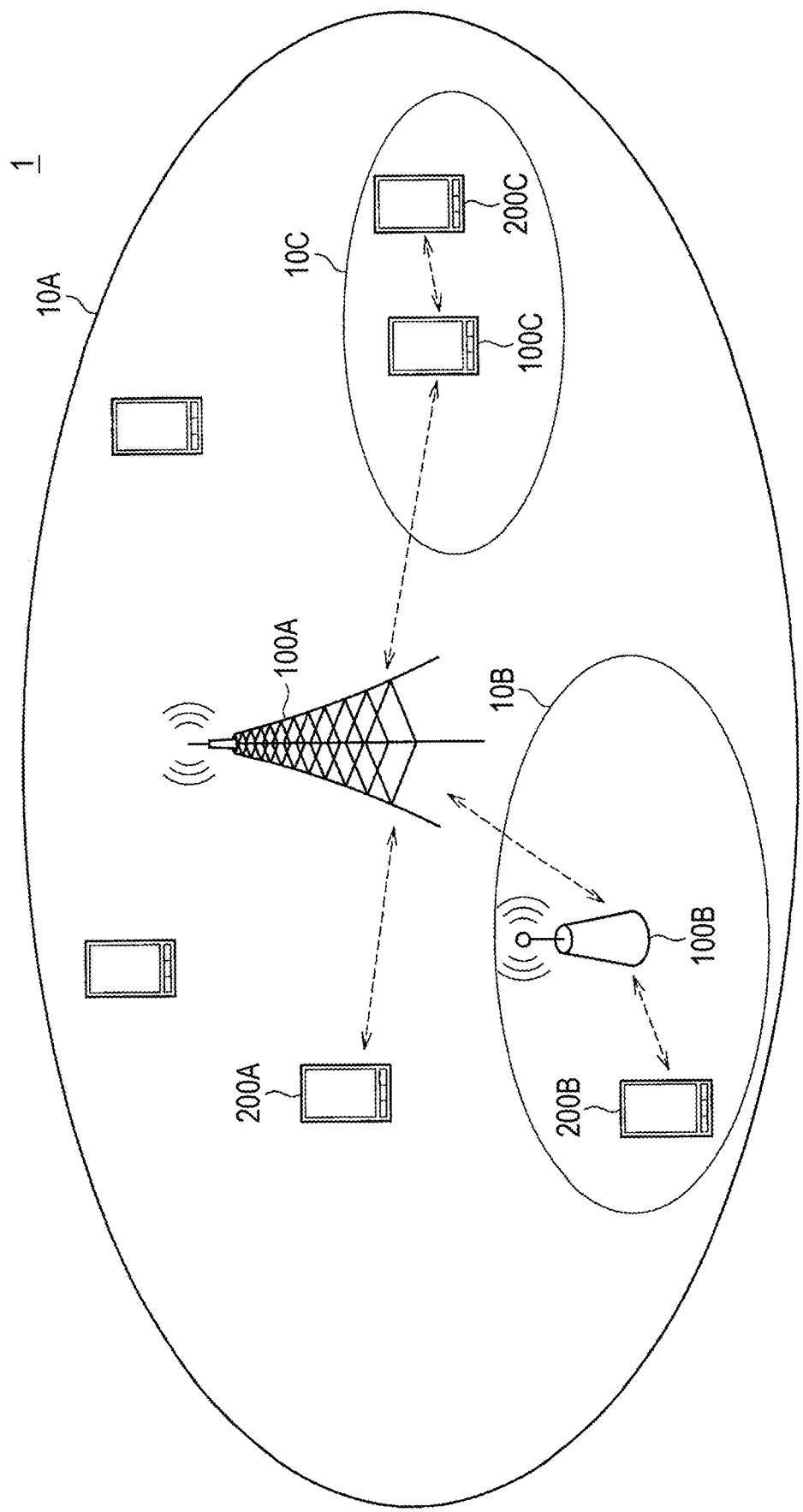
FIG. 1 is an explanatory diagram for describing an example of a schematic configuration of a system according to an embodiment of the present disclosure.

Hereinafter, preferred embodiments of the present disclosure will be described in detail with reference to the accompanying drawings. Note that in the present specification and the drawings, components having substantially the same functional configuration will be denoted by the same reference numerals, and an overlapping description thereof will be omitted.

Note that a description will be given in the following order.
1. Configuration example
    1.1. Example of system configuration
    1.2. Configuration example of base station
    1.3. Configuration example of terminal device
2. V2X communication
3. Mode of allocating resources to sidelink
4. Study on HD problem
5. Technical feature
    5.1. Recognition of each other's situation between transmission and reception terminals
    5.2. Classification of resources of sidelink into levels
    5.3. Example
        5.3.1. Example 1: first example of operation related to addition of unicast link
        5.3.2. Example 2: second example of operation related to addition of unicast link
        5.3.3. Example 3: third example of operation related to addition of unicast link
6. Application example
    6.1. Application example related to base station
    6.2. Application example related to terminal device
7. End <<1. Configuration Example>> <1.1. Example of System Configuration>

First, an example of a schematic configuration of a system 1 according to an embodiment of the present disclosure will be described with reference to FIG. 1. FIG. 1 is an explanatory diagram for describing an example of a schematic configuration of a system 1 according to an embodiment of the present disclosure. As illustrated in FIG. 1, the system 1 includes a wireless communication device 100 and a terminal device 200. Here, the terminal device 200 is also called a user. The user can also be called a user equipment (UE). A wireless communication device 100C is also called a UE-Relay. The UE here may be a UE defined in long term evolution (LTE) or LTE-Advanced (LTE-A), and the UE-Relay may be a prose UE to network relay discussed in 3rd generation partnership project (3GPP) and may more generally mean a communication device.

(1) Wireless Communication Device 100

The wireless communication device 100 is a device that provides a wireless communication service to subordinate devices. For example, a wireless communication device 100A is a base station of a cellular system (or a mobile communication system). The base station 100A performs wireless communication with a device (for example, a terminal device 200A) located inside a cell 10A of the base station 100A. For example, the base station 100A transmits a downlink signal to the terminal device 200A and receives an uplink signal from the terminal device 200A.

The base station 100A is logically connected to another base station by, for example, an X2 interface, and can transmit and receive control information and the like to and from another base station. Furthermore, the base station 100A is logically connected to a so-called core network (not illustrated) by, for example, an S1 interface, and can transmit and receive control information and the like to and from the core network. Note that communication between these devices can be physically relayed by various devices.

Here, the wireless communication device 100A illustrated in FIG. 1 is a macro cell base station, and the cell 10A is a macro cell. On the other hand, wireless communication devices 100B and 100C are master devices that operate small cells 10B and 10C, respectively. As an example, the master device 100B is a small cell base station that is fixedly installed. The small cell base station 100B establishes a wireless backhaul link with the macro cell base station 100A and an access link with one or more terminal devices (for example, a terminal device 200B) in the small cell 10B. Note that the wireless communication device 100B may be a relay node defined in 3GPP. The master device 100C is a dynamic access point (AP). The dynamic AP 100C is a mobile device that dynamically operates the small cell 10C. The dynamic AP 100C establishes a wireless backhaul link with the macro cell base station 100A and an access link with one or more terminal devices (for example, a terminal device 200C) in the small cell 10C. The dynamic AP 100C may be, for example, a terminal device mounted with hardware or software that can operate as a base station or a wireless access point. The small cell 10C in this case is a dynamically formed local network (localized network/virtual cell).

The cell 10A may be operated according to any wireless communication mode such as, for example, LTE, LTE-A, LTE-Advanced Pro, global system for mobile communications (GSM) (registered trademark), universal mobile telecommunication system (UMTS), wideband code division multiple access (W-CDMA), CDMA2000, world interoperability for microwave access (WiMAX), WiMAX2, IEEE 802.16, or the like.

Note that the small cell is a concept that can include various types of cells (for example, a femto cell, a nano cell, a pico cell, a micro cell, and the like) that are arranged to overlap or not to overlap the macro cell and are smaller than the macro cell. In a certain example, the small cell is operated by a dedicated base station. In another example, the small cell is operated by causing a terminal that becomes a master device to temporarily operate as a small cell base station. A so-called relay node can also be considered as a form of a small cell base station. A wireless communication device that functions as a master station of the relay node is also referred to as a donor base station. The donor base station may mean a DeNB in the LTE, and more generally, may mean a master station of the relay node.

(2) Terminal Device 200

The terminal device 200 can perform communication in the cellular system (or the mobile communication system). The terminal device 200 performs wireless communication with the wireless communication device (for example, the base station 100A or the master device 100B or 100C) of the cellular system. For example, the terminal device 200A receives a downlink signal from the base station 100A and transmits an uplink signal to the base station 100A.

Furthermore, the terminal device 200 is not limited to only a so-called UE, and may be, for example, a so-called low cost UE such as a machine type communication (MTC) terminal, an enhanced MTC (eMTC) terminal, and a narrow band-Internet of things (NB-IOT) terminal, and the like. Furthermore, the terminal device 200 may be an infrastructure terminal such as a road side unit (RSU) or a terminal such as a customer premises equipment (CPE).

(3) Supplement

The schematic configuration of the system 1 has been described hereinabove, but the present technology is not limited to the example illustrated in FIG. 1. For example, a configuration that does not include the master devices, a small cell enhancement (SCE), a heterogeneous network (HetNet), an MTC network, and the like, can be adopted as the configuration of the system 1. Furthermore, as another example of the configuration of the system 1, the master device may be connected to the small cell to construct a cell under the small cell.

1.2. Configuration Example of Base Station

Figure 2:
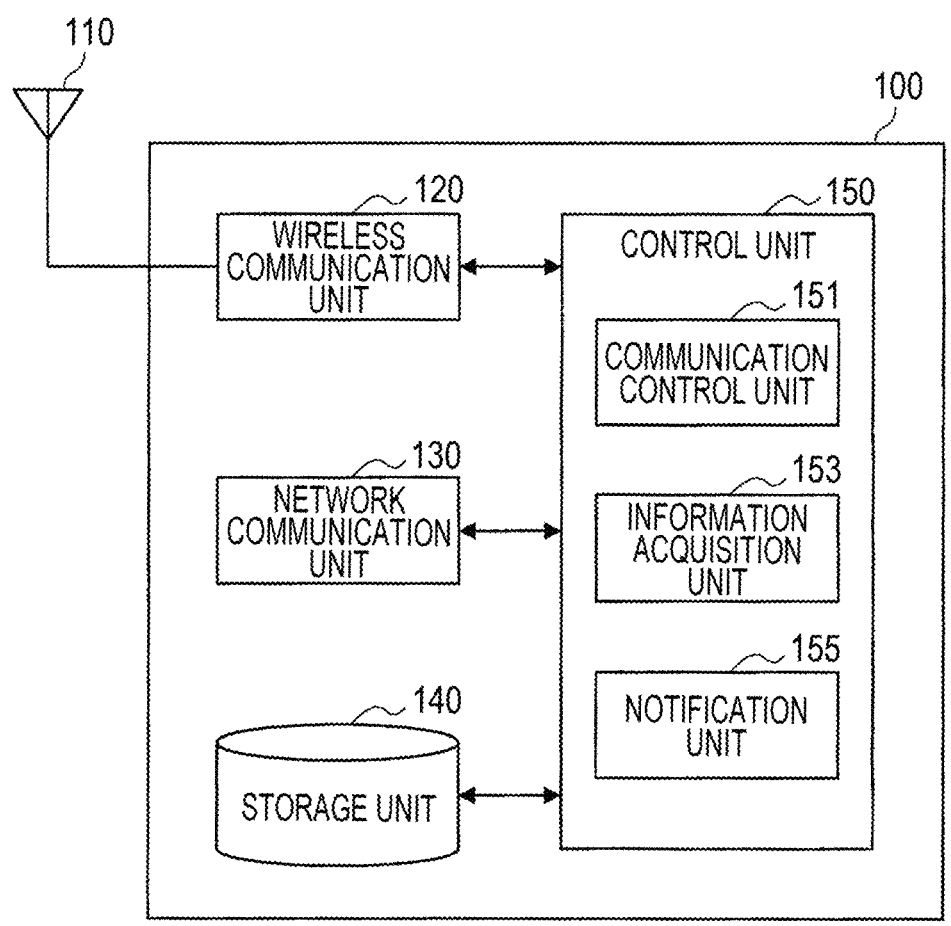
FIG. 2 is a block diagram illustrating an example of a configuration of a base station according to the embodiment.

Next, a configuration of the base station 100 according to the embodiment of the present disclosure will be described with reference to FIG. 2. FIG. 2 is a block diagram illustrating an example of a configuration of the base station 100 according to the embodiment of the present disclosure. Referring to FIG. 2, the base station 100 includes an antenna unit 110, a wireless communication unit 120, a network communication unit 130, a storage unit 140, and a control unit 150.

(1) Antenna Unit 110

The antenna unit 110 radiates a signal output from the wireless communication unit 120 into a space as a Radio Wave. Furthermore, the Antenna Unit 110 converts a radio wave in the space into a signal and outputs the signal to the wireless communication unit 120.

(2) Wireless communication unit 120

The wireless communication unit 120 transmits and receives a signal. For example, the wireless communication unit 120 transmits a downlink signal to the terminal device and receives an uplink signal from the terminal device.

(3) Network Communication Unit 130

The network communication unit 130 transmits and receives information. For example, the network communication unit 130 transmits information to another node and receives information from another node. For example, another node described above includes another base station and a core network node.

Note that, as described above, in the system 1 according to the present embodiment, the terminal device may operate as a relay terminal to relay communication between a remote terminal and the base station. In such a case, for example, the wireless communication device 100C corresponding to the relay terminal may not include the network communication unit 130.

(4) Storage Unit 140

The storage unit 140 temporarily or permanently stores a program for operating the base station 100 and various data.

(5) Control Unit 150

The control unit 150 provides various functions of the base station 100. The control unit 150 includes a communication control unit 151, an information acquisition unit 153, and a notification unit 155. Note that the control unit 150 can further include other components other than these components. In other words, the control unit 150 can also perform operations other than operations of these components.

The communication control unit 151 executes various processes related to the control of wireless communication with the terminal device 200 via the wireless communication unit 120. Furthermore, the communication control unit 151 executes various processing related to the control of communication with another node (for example, another base station, a core network node or the like) via the network communication unit 130.

The information acquisition unit 153 acquires various information from the terminal device 200 or another node. The acquired information may be used, for example, for controlling wireless communication with the terminal device, controlling cooperation with another node, and the like.

The notification unit 155 notifies the terminal device 200 or another node of various information. As a specific example, the notification unit 155 may notify a terminal device in a cell of various information for the terminal device to perform wireless communication with the base station. Furthermore, as another example, the notification unit 155 may notify another node (for example, another base station) of the information acquired from the terminal device in the cell.

1.3. Configuration Example of Terminal Device

Figure 3:
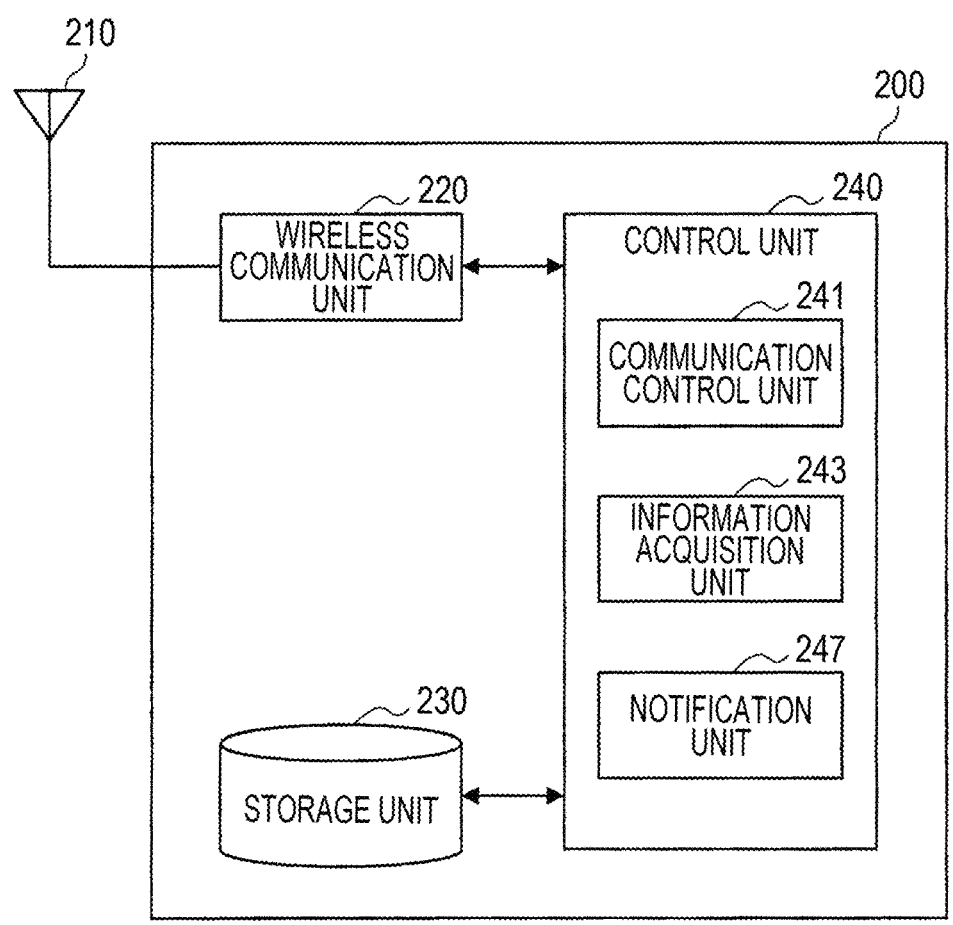
FIG. 3 is a block diagram illustrating an example of a configuration of a terminal device according to the embodiment.

Next, an example of a configuration of the terminal device 200 according to the embodiment of the present disclosure will be described with reference to FIG. 3. FIG. 3 is a block diagram illustrating an example of a configuration of the terminal device 200 according to the embodiment of the present disclosure. As illustrated in FIG. 3, the terminal device 200 includes an antenna unit 210, a wireless communication unit 220, a storage unit 230, and a control unit 240.

(1) Antenna Unit 210

The antenna unit 210 radiates a signal output from the wireless communication unit 220 into a space as a radio wave. Furthermore, the antenna unit 210 converts a radio wave in the space into a signal and outputs the signal to the wireless communication unit 220.

(2) Wireless Communication Unit 220

The wireless communication unit 220 transmits and receives a signal. For example, the wireless communication unit 220 receives a downlink signal from the base station and transmits an uplink signal to the base station.

Furthermore, in the system 1 according to the present embodiment, the terminal device 200 may directly communicate with another terminal device 200 without the intervention of the base station 100. In this case, the wireless communication unit 220 may transmit and receive a sidelink signal to and from another terminal device 200.

(3) Storage Unit 230

The storage unit 230 temporarily or permanently stores a program for operating the terminal device 200 and various data.

(4) Control Unit 240

The control unit 240 provides various functions of the terminal device 200. For example, the control unit 240 includes a communication control unit 241, an information acquisition unit 243, and a notification unit 247. Note that the control unit 240 can further include other components other than these components. In other words, the control unit 240 can also perform operations other than operations of these components.

The communication control unit 241 executes various processing related to the control of wireless communication with the base station 100 or another terminal device 200 via the wireless communication unit 220. For example, the communication control unit 241 may reserve resources used for transmission of a packet. Furthermore, the communication control unit 241 may select some of the reserved resources and perform control so that the packet is transmitted using the selected resources.

Furthermore, the communication control unit 241 may make a predetermined determination on the basis of information acquired from the base station 100 or another terminal device 200. As a more specific example, the communication control unit 241 may determine whether or not the packet can be transmitted to another terminal device 200. Furthermore, at this time, the communication control unit 241 may determine whether or not to drop a packet scheduled to be transmitted to another terminal device 200.

The information acquisition unit 243 acquires various information from base station 100 or another terminal device 200. As a specific example, the information acquisition unit 243 may acquire information (for example, a reception capability and the like) regarding another terminal device 200 from another terminal device 200. Furthermore, the information acquisition unit 243 may acquire various information for selecting resources to be used for communication with another terminal device 200 from the base station 100 or another terminal device 200. As a more specific example, the information acquisition unit 243 may acquire information regarding resources reserved by another terminal device 200 from another terminal device 200.

The notification unit 247 notifies the base station 100 and another terminal device 200 of various information. As a specific example, the notification unit 247 may notify another terminal device 200 (for example, the terminal device 200 which is a transmission destination of data or a packet scheduled to be transmitted) of information regarding the data or the packet. Furthermore, the notification unit 247 may notify another terminal device 200 of information regarding resources reserved to be used for transmission of the packet.

2. V2X Communication

Figure 4:
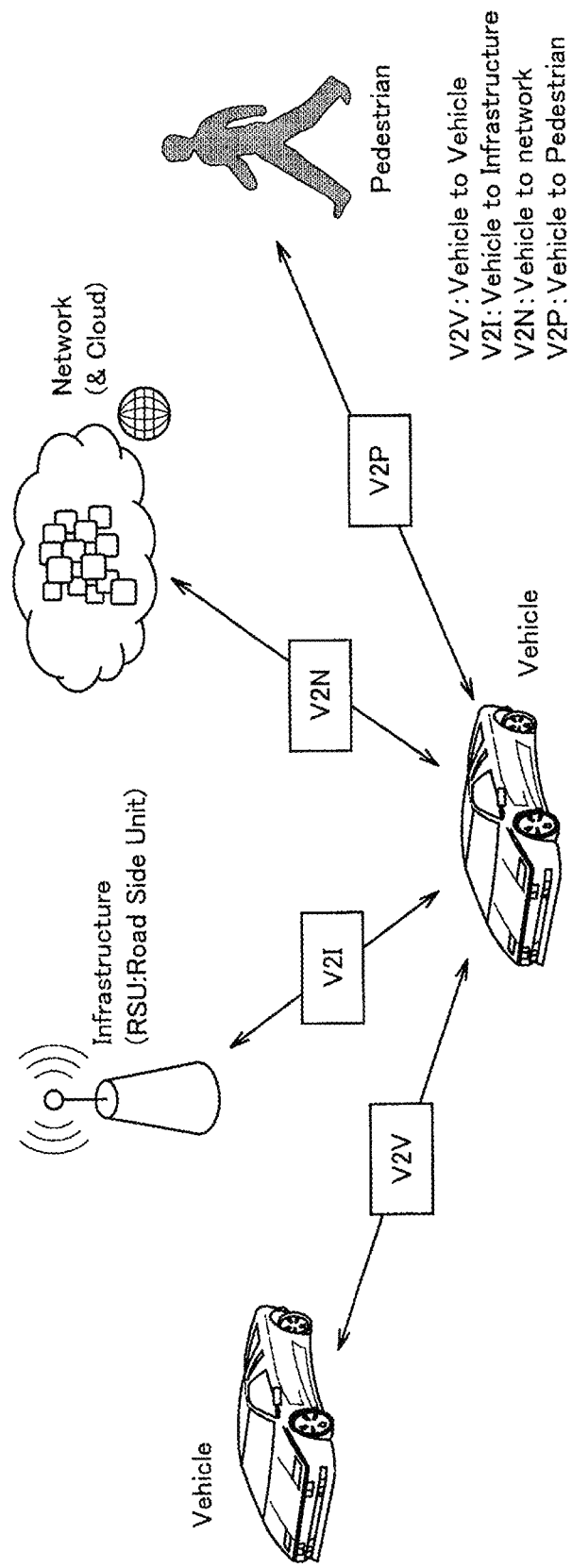
FIG. 4 is a diagram illustrating an outline of V2X communication.

Next, an outline of V2X communication will be described. The V2X communication is an abbreviation for Vehicle to X communication, and is a system in which "something" performs communication with a vehicle. For example, FIG. 4 is a diagram illustrating an outline of V2X communication. Examples of "something" here include a vehicle, an infrastructure, a network, a pedestrian, and the like (V2V, V2I, V2N, and V2P), for example, as illustrated in FIG. 4.

(Overview of V2X Communication)

Figure 5:
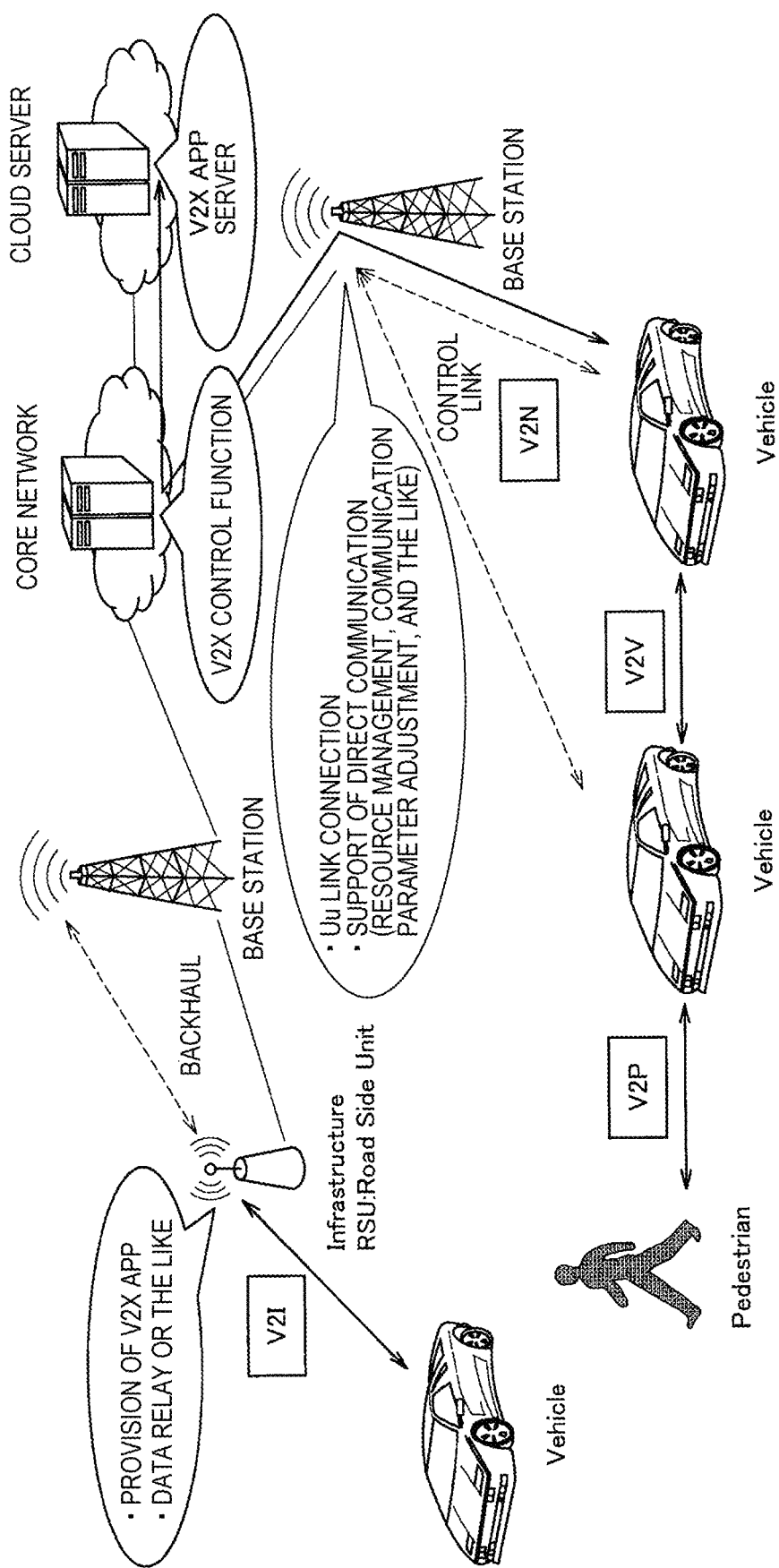
FIG. 5 is an explanatory diagram for describing an example of an overview of the V2X communication.

Furthermore, FIG. 5 is an explanatory diagram for describing an example of an overview of the V2X communication. In the example illustrated in FIG. 5, a V2X application server (APP server) is held as a cloud server, and control of V2X communication on a core network side is performed by the V2X application server. The base station performs Uu-link communication with the terminal device, and performs communication control of direct communication such as V2V communication, V2P communication or the like. Furthermore, in addition to the base station, a road side unit (RSU) is arranged as an infrastructure of a road side. Two RSUs, that is, a base station-type RSU and a UE-type RSU are conceivable. In the RSU, a V2X application (V2X APP) is provided or data relay or the like is supported.

(Use Case of V2X Communication)

Figure 6:
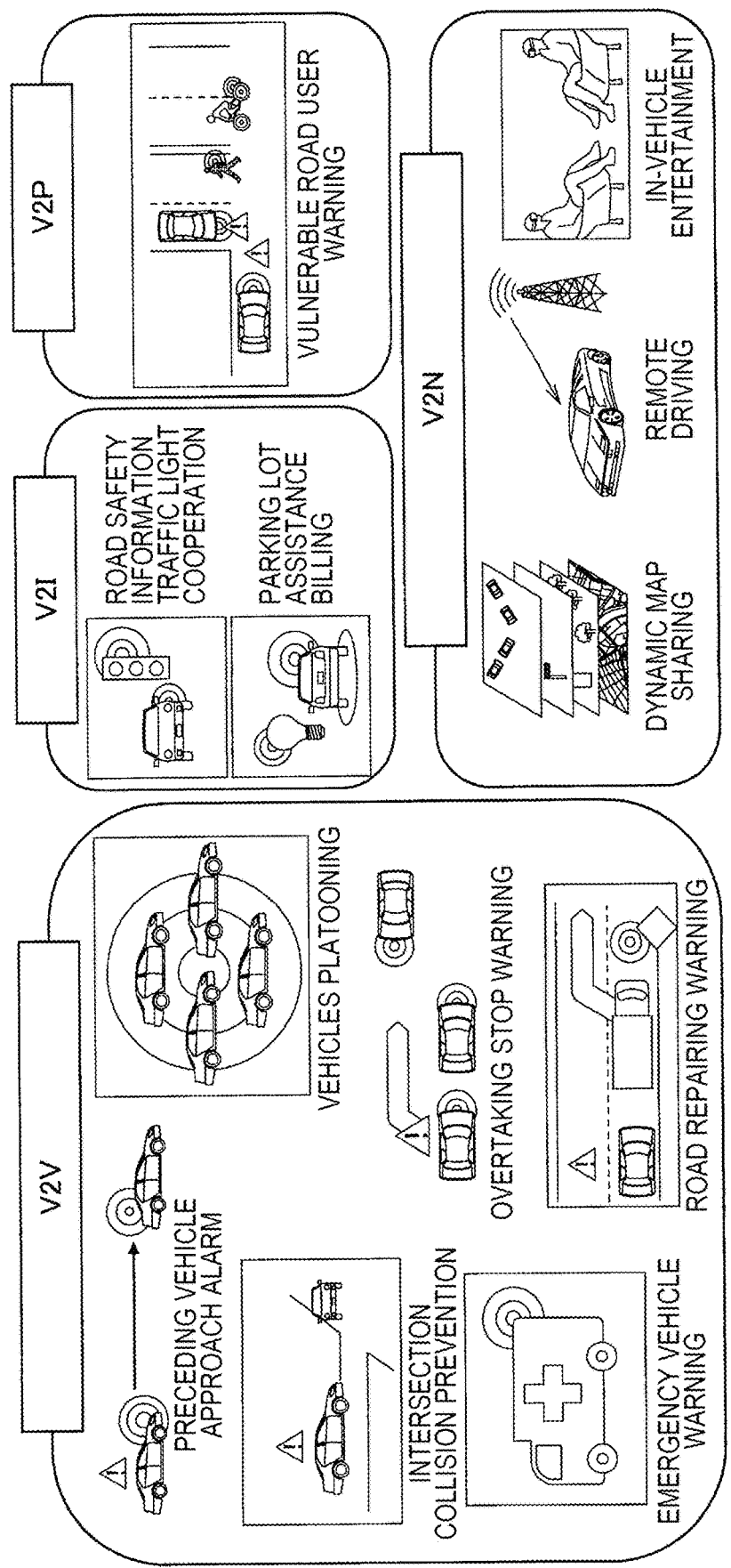
FIG. 6 is a diagram illustrating an example of a use case of the V2X communication.

As wireless communication for a vehicle, 802.11p-based dedicated short range communication (DSRC) has been mainly developed till now, but in recent years, standardization of "LTE-based V2X (LTE-based V2X communication)", which is LTE-based in-vehicle communication, has been performed. In the LTE-based V2X communication, an exchange of a basic safety message and the like is supported. Meanwhile, with the aim of further improving the V2X communication, new radio (NR) V2X communication using a 5G technology (NR) has been studied in recent years. For example, FIG. 6 is a diagram illustrating an example of a use case of the V2X communication.

In the NR V2X communication, new use cases that require a high reliability, a low delay, high speed communication, and a high capacity that were difficult to support with the LTE-based V2X till now are supported. Specific examples of these use cases include provision of a dynamic map, remote driving, or the like among examples illustrated in FIG. 6. Furthermore, in addition to this, specific examples of these use cases include sensor data sharing in which sensor data is exchanged between vehicles or between a road and a vehicle or a platooning use case for vehicles platooning. Such use cases and requirements for V2X communications are defined in 3GPP TR 22.886. For reference, an outline of an example of use cases will be described below.

(1) Vehicles Platoonning

This is a use case of vehicles platooning in which a plurality of vehicles becomes a platoon and travel in the same direction, and information for controlling the vehicles platooning is exchanged between a vehicle leading the vehicles platooning and another vehicle. By exchanging these information, for example, it becomes possible to further reduce an inter-vehicle distance of the vehicles platooning.

(2) Extended Sensors

This is a use case in which sensor-related information (raw data before data processing or data after processing) can be exchanged between vehicles, or the like. The sensor information is collected through local sensors, live video images (for example, live video images between a vehicle and surrounding vehicles, RSUs, and pedestrians), V2X application servers, and the like. By exchanging these information, it becomes possible for the vehicle to obtain information that cannot be obtained from its own sensor information and it becomes possible for the vehicle to perceive/recognize a wider range of environments. Note that in the present use case, since it is necessary to exchange a lot of information, a high data rate is required for communication.

(3) Advanced Driving

This is a use case that enables semi-automatic driving and fully automatic driving. In the present use case, the RSU shares perception/recognition information obtained from its own sensor and the like with the surrounding vehicle, such that each vehicle can adjust a track or an operation in synchronization and cooperation with another vehicle. Furthermore, each vehicle can share an intention or an intent of driving with the surrounding vehicle.

(4) Remote Driving

This is a use case that causes a remote operator or a V2X application to perform a remote operation. Remote control is used in a case where another person does the driving instead of a person who has difficulty in doing the driving, a case of operating a vehicle in a dangerous area, or the like. For example, a cloud computing-based operation can be applied to public transportation where routes or roads along which the vehicle is to travel are determined to some extent. In the present use case, a high reliability and a low transmission delay are required for communication.

(Physical Layer Enhancement)

Further enhancement of a physical layer from LTE V2X is required in order to achieve the requirements described above. A target link includes a Uu link or a PC5 link (sidelink). The Uu link is a link between an infrastructure such as a base station, a road side unit (RSU), or the like and a terminal device. Furthermore, the PC5 link (sidelink) is a link between terminal devices. Main points of the enhancement are shown below.

Examples of the enhancement include:
Channel format
Sidelink feedback communication
Sidelink resource allocation mode
Vehicle position information estimation technology
Inter-terminal relay communication
Support of unicast communication and multicast communication
Multi-carrier communication and carrier aggregation
Multiple-input multiple-output (MIMO)/beamforming
High frequency support (for example: 6 GHz or higher)
. . . and the like.

Furthermore, examples of the channel format include flexible numerology, a short transmission time interval (TTI), multi-antenna support, a waveform, and the like. Furthermore, examples of the sidelink feedback communication include a hybrid automatic repeat request (HARQ), channel status information (CSI), and the like.

(V2X Operation Scenario)

Hereinafter, an example of a V2X communication operation scenario will be described. In V2N communication, only DL/UL communication between a base station and a terminal device was performed, which was simple. On the other hand, in V2V communication, various communication paths are considered. Each scenario will hereinafter be described, mainly focusing on an example of the V2V communication, but a similar communication operation can also be applied to V2P or V2I. Note that in the V2P or the V2I, a communication destination is a pedestrian or an RSU.

Figure 7:
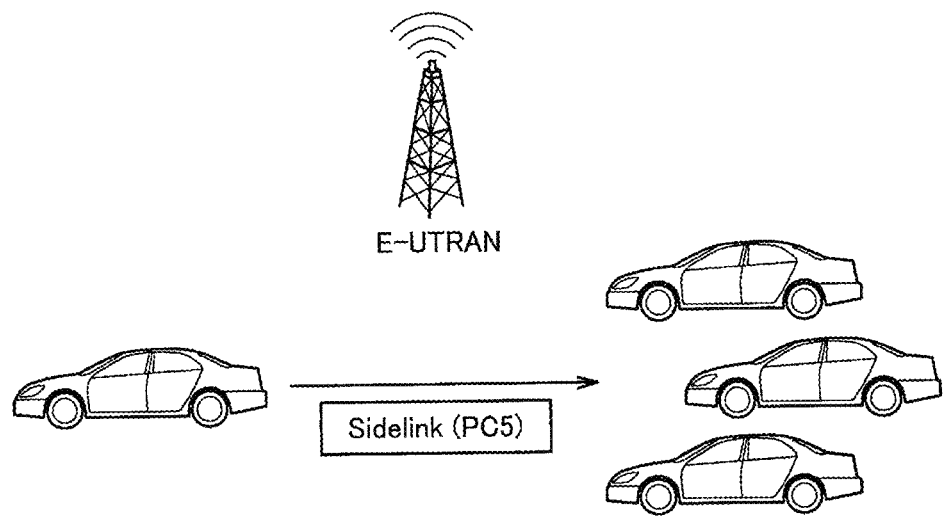
FIG. 7 is an explanatory diagram for describing an example of a V2X operation scenario.
Figure 8:
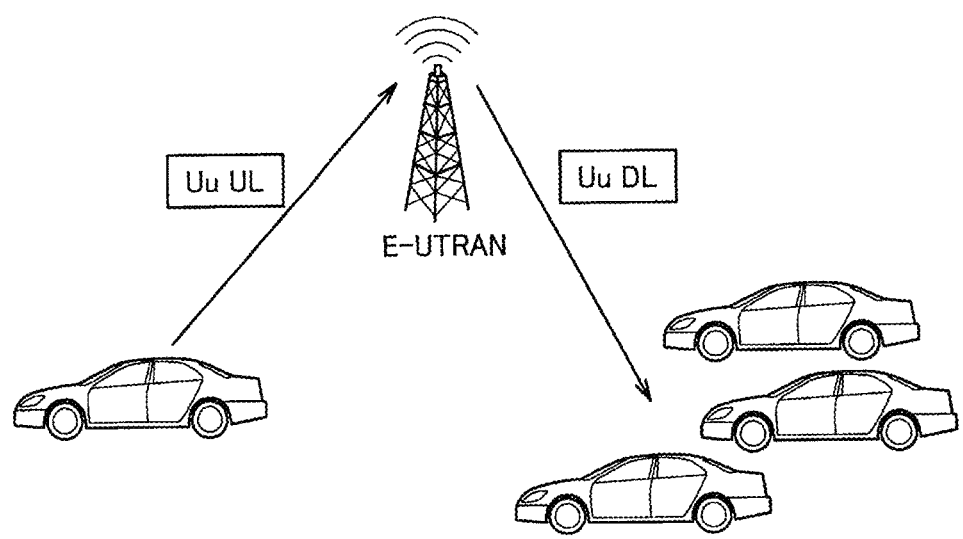
FIG. 8 is an explanatory diagram for describing an example of a V2X operation scenario. 5
Figure 9:
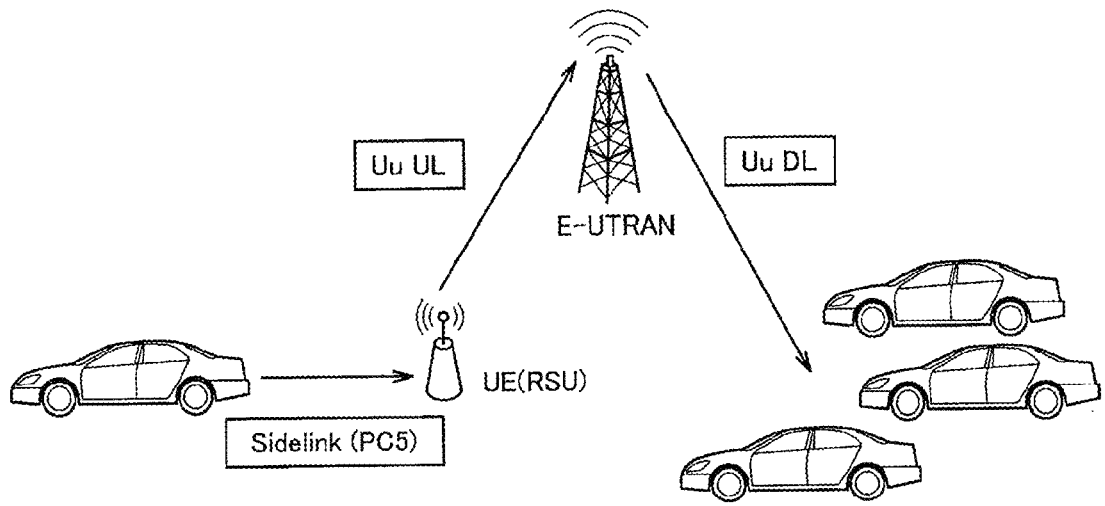
FIG. 9 is an explanatory diagram for describing an example of a V2X operation scenario.
Figure 10:
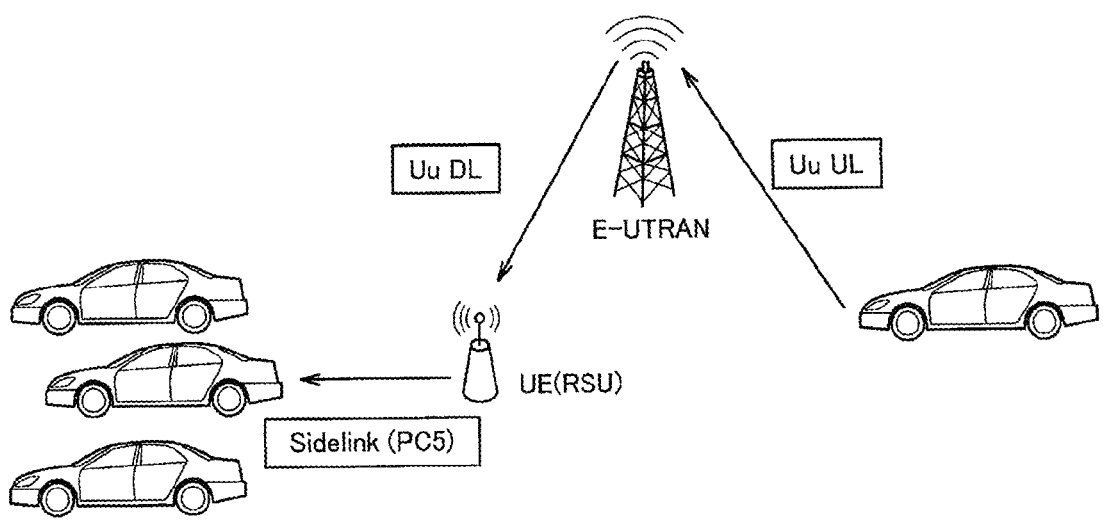
FIG. 10 is an explanatory diagram for describing an example of a V2X operation scenario.
Figure 11:
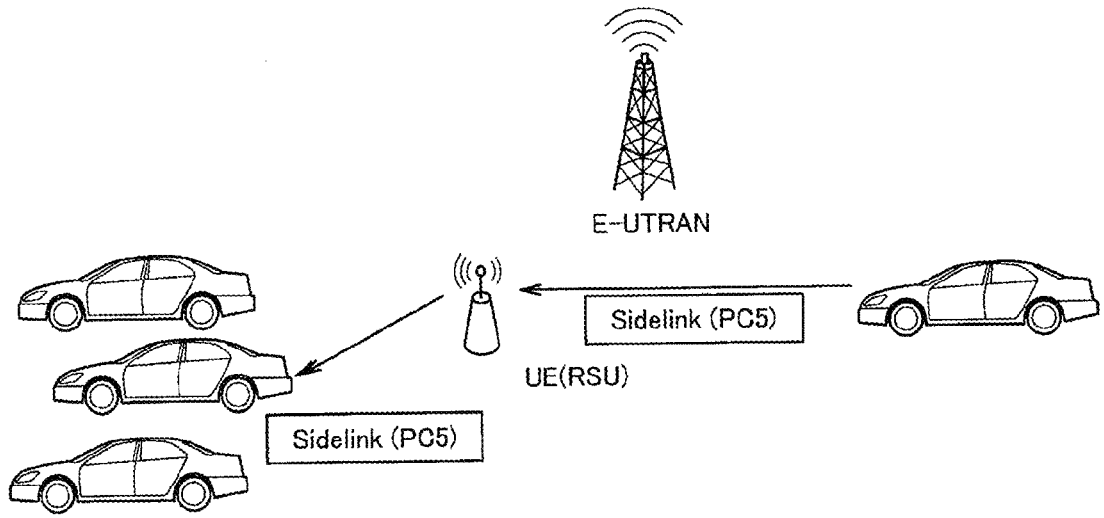
FIG. 11 is an explanatory diagram for describing an example of a V2X operation scenario.
Figure 12:
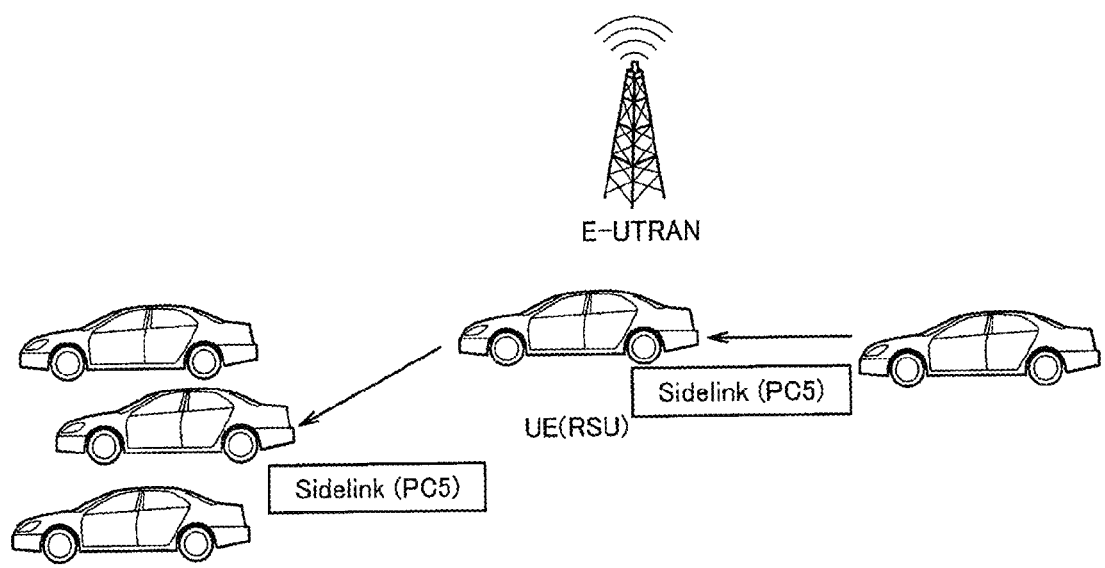
FIG. 12 is an explanatory diagram for describing an example of a V2X operation scenario.

For example, FIGS. 7 to 12 are explanatory diagrams for describing examples of V2X operation scenarios. Specifically, FIG. 7 illustrates a scenario in which vehicles communicate directly with each other without the intervention of a base station (evolved universal mobile telecommunication system (UMTS) terrestrial radio access network (E-UTRAN)). FIG. 8 illustrates a scenario in which vehicles communicate with each other via a base station. FIGS. 9 and 10 illustrate scenarios in which vehicles communicate with each other via a terminal device (UE, here RSU) and a base station. FIGS. 11 and 12 illustrate scenarios in which vehicles communicate with each other via a terminal device (UE, here RSU or another vehicle).

Note that in FIGS. 7 to 12, a "sidelink" corresponds to a communication link between terminal devices and is also referred to as PC5. Specific examples of the sidelink include communication links of V2V, V2P, and V2I. A "Uu interface" corresponds to a wireless interface between a terminal device and a base station. A specific example of the Uu interface includes a communication link of V2N. A "PC5 interface" corresponds to a wireless interface between terminal devices.

3. Sidelink Resource Allocation Mode

Next, an outline of a mode of allocating resources to the sidelink will be described. As the mode of allocating the resources to the sidelink, there are a "Mode3 resource allocation" mode in which the base station allocates the resources of the sidelink and a "Mode4 resource allocation" mode in which the terminal device itself performs sensing and performs resource selection of the sidelink. Here, a description will be provided, mainly focusing on the Mode4 resource allocation mode.

Resource Pool Allocation

In performing the Mode4 resource allocation, allocation of a resource pool is performed in advance. The allocation of the resource pool is performed by, for example, the base station. Furthermore, as another example, the allocation of the resource pool may be performed by preconfiguration. The terminal device senses resources for sidelink communication from the allocated resource pool, selects an appropriate resource by itself, and performs communication.

Figure 13:
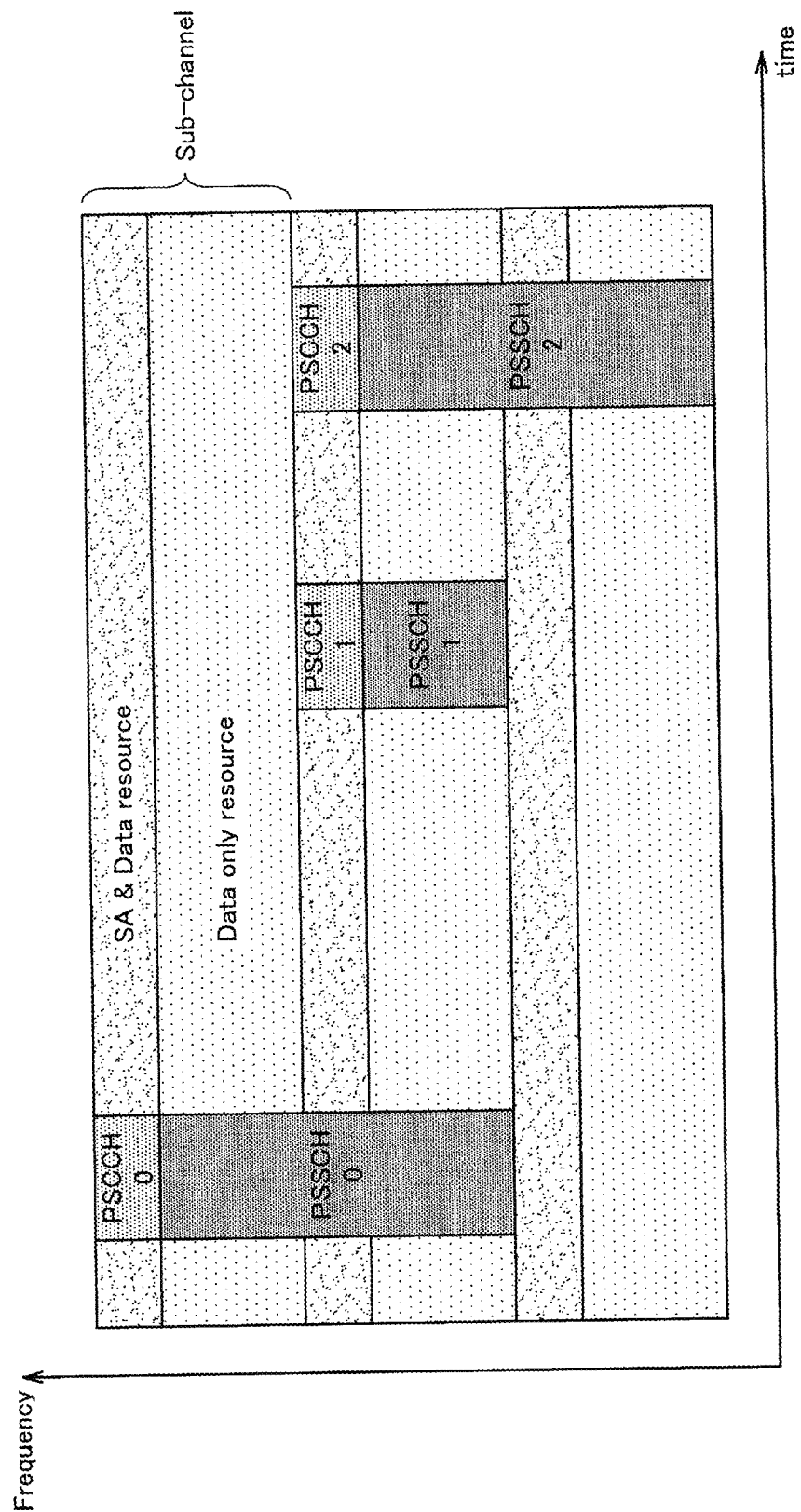
FIG. 13 is a diagram illustrating an example of a configuration of resources allocated to sidelink communication.

For example, FIG. 13 is a diagram illustrating an example of a configuration of resources (resource pool) allocated to sidelink communication, and illustrates an example of a case where frequency division multiplexing (FDM) is applied. As illustrated in FIG. 13, the resource pool is divided into a scheduling assignment (SA) area and a Data area, and a physical sidelink control channel (PSCCH) and a physical sidelink shared channel (PSSCH) are transmitted by each area. Note that a description will hereinafter be provided, focusing on a case where the FDM is applied as illustrated in FIG. 13, but an application destination of the technology according to the present disclosure is not necessarily limited. As a specific example, also in a case where time division multiplexing (TDM) is applied, it is possible to apply a technology according to the present disclosure described below. Note that in a case where the TDM is applied, the SA area and the Data area are orthogonal to each other on a time axis.

Mode4 Resource Allocation

Figure 14:
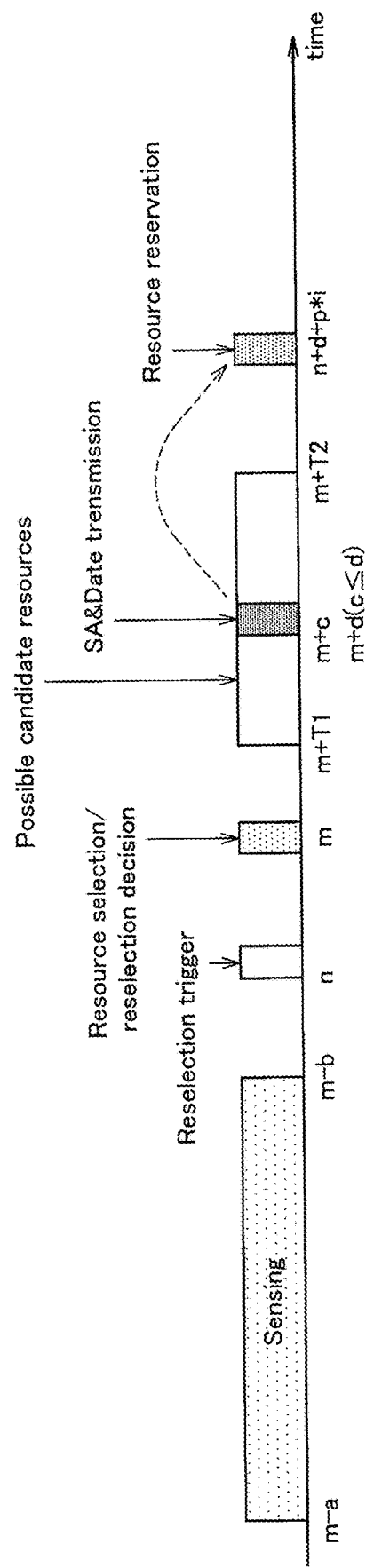
FIG. 14 is an explanatory diagram for describing an example of an operation timeline in a case where the terminal device transmits a packet on the basis of Mode4 resource allocation. 20

An outline of a Mode4 resource allocation will be described with reference to FIG. 14. FIG. 14 is an explanatory diagram for describing an example of an operation timeline in a case where the terminal device transmits a packet on the basis of Mode4 resource allocation. As illustrated in FIG. 14, the terminal device that transmits a packet first performs sensing in order to discover a resource used for transmission of the packet from the resource pool. Next, the terminal device selects the resource from the resource pool on the basis of a result of the sensing. Then, the terminal device transmits the packet using the selected resource. Furthermore, at this time, the terminal device performs reservation of a resource to be used for subsequent packet transmission, if necessary.

Figure 15:
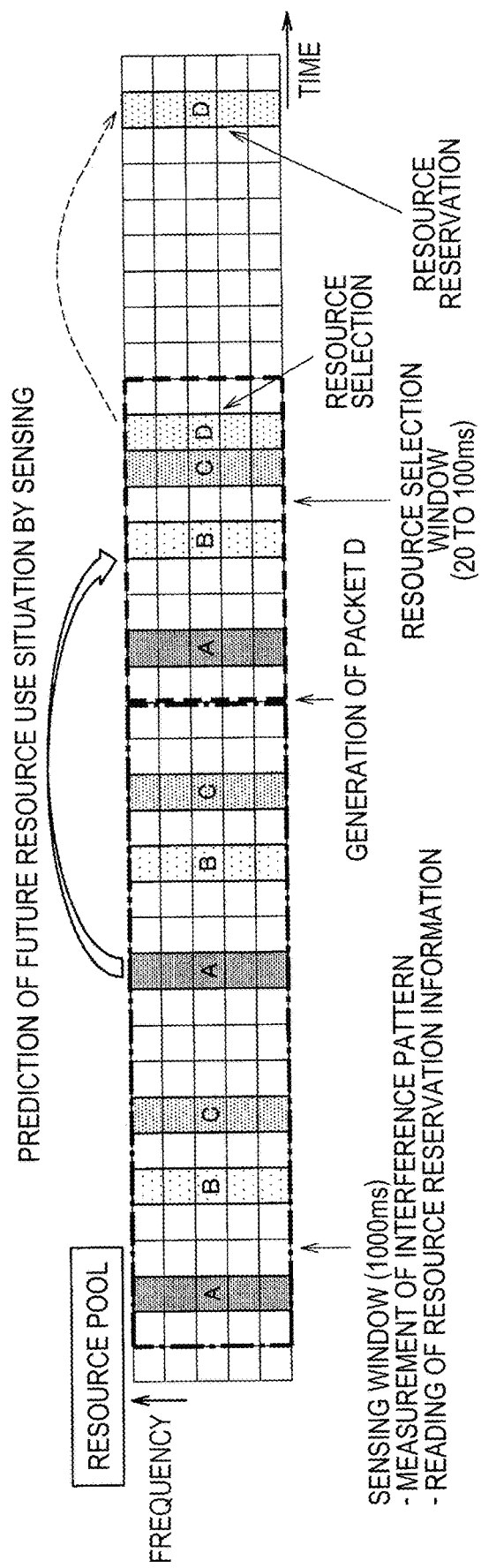
FIG. 15 is an explanatory diagram for describing an example of a sensing operation for selecting a resource from a resource pool.

Here, an example of the sensing operation described above will be described with reference to FIG. 15. FIG. 15 is an explanatory diagram for describing an example of the sensing operation for selecting the resource from the resource pool.

Specifically, the terminal device performs selection of a resource or reservation of a future resource in a resource selection window on the basis of a measurement result of an interference pattern in a sensing window or a resource reservation situation in the sensing window. As a specific example, in the example illustrated in FIG. 15, in a case where a packet D, which is a target to be transmitted, is generated, the terminal device predicts a future resource use situation, for example, resources to be used for transmission of the other packets A to C in the future on the basis of the result of the sensing. The terminal device can select or reserve a resource available for transmission of the packet D, that is, a resource that is predicted not to be used for transmission of the other packets by using a result of the prediction.

4. Study on HD Problem

The present disclosure focuses particularly on a resource allocation mode of a V2V communication link in NR V2X communication. In the NR V2X communication, unicast communication whose amount of communication data is larger than that of broadcast communication applied in conventional V2X communication is supported. Against this background, in the NR V2X communication, there is a possibility that a so-called half duplex (HD) problem that might occur even in the broadcast communication in the conventional V2V communication will more significantly emerge. Therefore, the present disclosure focuses particularly on the HD problem in the NR V2X communication.

Here, an outline of the HD problem will be described. In inter-device communication typified by V2X communication in a sidelink, there may be a restriction called a so-called half duplex (HD) that transmission and reception are limited to being performed in a time division manner, such that the transmission or the reception cannot be always performed. Due to such a restriction, the terminal device 200 is restricted from receiving a packet transmitted from another terminal device 200 at a timing when the terminal device 200 performs transmission.

In conventional LTE-V2X communication, repetition transmission of broadcast communication is supported. Therefore, even in a case where the reception of the packet is restricted by the transmission of the packet, it becomes possible to increase a reception success rate of the packet using the next reception opportunity.

On the other hand, in the NR V2X communication, as described above, not only broadcast communication but also unicast communication that enables transmission and reception of a signal having a larger capacity than the broadcast communication is supported. It is presumed that the transmission and the reception of such a signal having the large capacity largely depend on the restriction of the HD.

Figure 16:
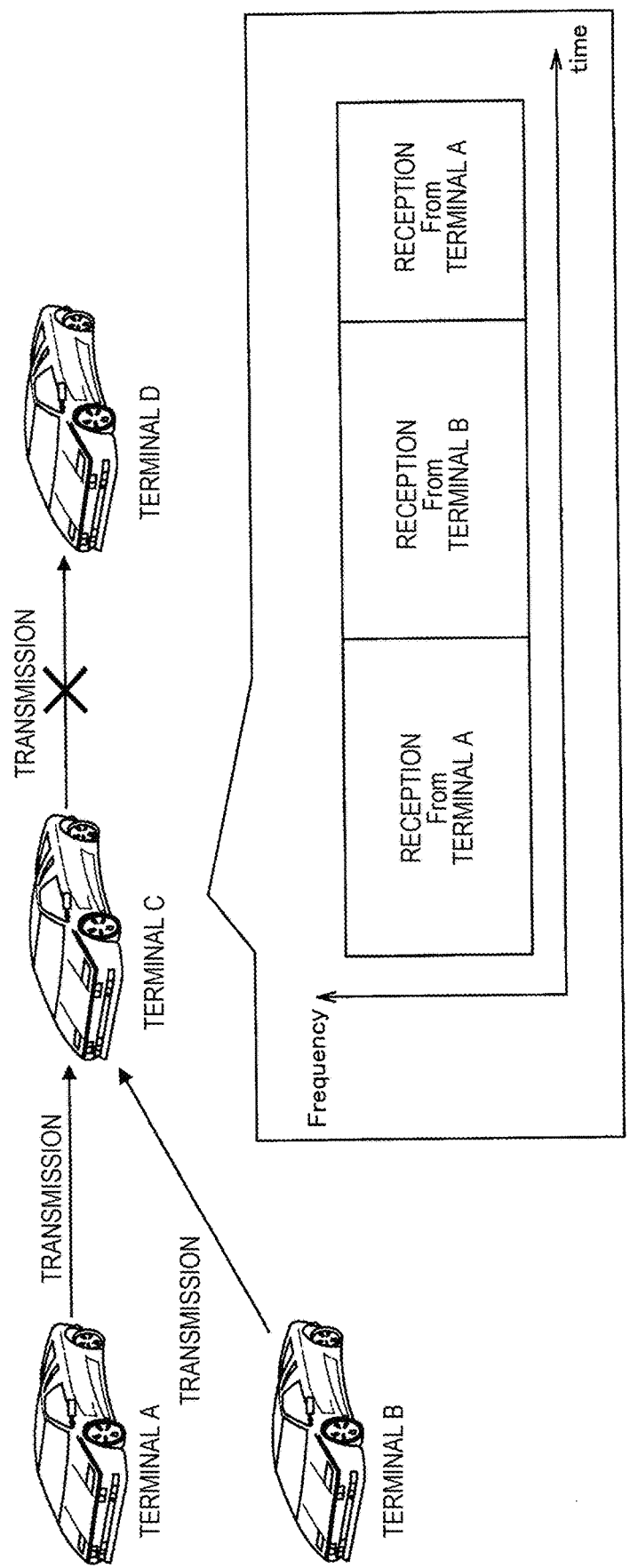
FIG. 16 is an explanatory diagram for describing an outline of an example of a half duplex (HD) problem.

Here, an outline of an example of the HD problem that is presumed to emerge in the NR V2X communication will be described with reference to FIG. 16. FIG. 16 is an explanatory diagram for describing an outline of an example of the HD problem. In FIG. 16, each of terminal A to terminal D corresponds to the terminal device 200 according to the present disclosure.

In the example illustrated in FIG. 16, each of the terminal A and the terminal B is trying to transmit a packet to the terminal C. Furthermore, the terminal C is trying to transmit a packet to the terminal D. Under such a situation, if each of the terminal A and the terminal B perform transmission of the packet to the terminal C endlessly, there is a possibility that the terminal C will be restricted from transmitting the packet to the terminal D due to the reception of the packet from each of the terminal A and the terminal B and furthermore lose an opportunity to transmit the packet to the terminal D. In particular, unicast communication is significantly different from a traffic that broadcasts packets having a relatively small capacity, such that the HD problem described above with reference to FIG. 16 is more likely to emerge.

Against this background, it is presumed that coordination between the transmission and the reception is necessary in order to further suppress the emergence of the HD problem. Therefore, the present disclosure proposes a technology capable of further suppressing emergence of an HD problem in inter-device communication such as V2X communication (particularly, inter-device communication with a restriction of HD such as sidelink communication).

5. Technical Feature

Next, a description will be provided, focusing on a technology capable of further suppressing emergence of an HD problem particularly in inter-device communication such as sidelink communication or the like in NR V2X communication, as a technical feature of the system according to the embodiment of the present disclosure. Specifically, each of the following approaches will be described as an example of the technology capable of further suppressing the emergence of HD the problem.

Recognition of each other's situation between transmission and reception terminals Classification of resources of sidelink into levels

5.1. Recognition of Each Other's Situation Between Transmission and Reception Terminals As an example of the technology capable of suppressing the emergence of the HD problem, first, a technology of suppressing the emergence of the HD problem by recognizing each other's situation between transmission and reception terminals will be described.

An exchange of information between terminal devices is determined according to any one of Mode4 resource allocation and Mode3 resource allocation. For example, in a case of the Mode4 resource allocation, there is a notification using sidelink control information (SCI) or a notification using sidelink radio resource control (RRC) signalling. The sidelink RRC signalling is RRC information defined between terminal devices. In a case of the Mode3 resource allocation, there is a notification by RRC signalling between a terminal and a base station.

(1) Advance Exchange of Information

First, an exchange of information performed before transmission of a packet between a terminal device 200 (that is, a transmission terminal) corresponding to a transmitting side and a terminal device 200 (reception terminal) corresponding to a receiving side will be described separately in a case of the Mode4 resource allocation and a case of the Mode3 resource allocation. Note that in the following description, for convenience, a description will be provided, focusing on a case where a terminal device 200-1 transmits a packet to a terminal device 200-2. That is, it is assumed that the terminal device 200-1 operates as a transmission terminal and transmits a packet to the terminal device 200-2 operating as a reception terminal. On the other hand, the terminal device 200-1 may operate as a reception terminal, and the terminal device 200-2 may operate as a transmission terminal. That is, in a case where the terminal device 200-1 receives a packet transmitted from another terminal device 200, the terminal device 200-1 operates as the reception terminal. Furthermore, in a case where the terminal device 200-2 transmits a packet to another terminal device 200, the terminal device 200-2 operates as the transmission terminal.

(1-1) Case of Mode4 Resource Allocation

Hereinafter, an exchange of information between the terminal devices 200 will be described, focusing on the case of the Mode4 resource allocation.

(1-1-1) Notification from Transmission Terminal to Reception Terminal

First, an example of information of which the terminal device 200-1 (transmission terminal) notifies the terminal device 200-2 (reception terminal) will be described. The terminal device 200-1 may notify the terminal device 200-2, which is a transmission destination of the packet, for example, of, for example, buffer information of transmission data, information regarding the future packet transmission schedule, packet type information, and the like, in advance. Examples of the packet type information described above include information regarding a type of traffic such as unicast, broadcast, multicast, or the like, information regarding a priority, information regarding a delay request, information regarding the presence or absence of a relay, and the like. Furthermore, in V2X communication, there is a case where freshness or an effective period of the packet is set. In such a case, the terminal device 200-1 may notify the terminal device 200-2 of information regarding a reception period of the packet, in advance.

Furthermore, in a case where the terminal device 200-1 (transmission terminal) is scheduled to transmit data having a higher importance than normal data, the terminal device 200-1 (transmission terminal) may notify the terminal device 200-2 (reception terminal) that a packet is to be transmitted for important data. Furthermore, the terminal device 200-1 may notify the terminal device 200-2 that a unicast traffic is to be transmitted in a case where the data is transmitted by the unicast.

In this case, a certain specific resource area is only required to be provided with an area for notifying the terminal device 200-2 whether or not there is important data as data scheduled to be transmitted. Note that the area will hereinafter be referred to as an "important data notification area". Furthermore, the notification will hereinafter be referred to as a "notification of presence or absence of important data" for convenience. By providing the important data notification area as described above, the terminal device 200-2 (reception terminal) can recognize that a packet of the important data is included in the packet transmitted from the terminal device 200-1 (transmission terminal), in advance on the basis of information notification of which is provided via the area. Furthermore, in a case where the terminal device 200-2 has been notified that there is important data, the terminal device 200-2 can prioritize an operation related to reception and take measures such as limiting an operation related to transmission, or the like.

Furthermore, a resource for notifying the terminal device 200-2 of the presence or absence of the important data may be defined. The resource may be defined as a resource pool. Furthermore, the resource may be set by the base station 100 or may be preconfigured.

Furthermore, a data area in which a priority of transmission and reception is controlled according to the notification of the presence or absence of the important data may be defined as a specific data area. In this case, priority control of transmission and reception may be applied only to the specific data area.

Specifically, the terminal device 200-1 (transmission terminal) notifies the terminal device 200-2, which is the transmission destination of the packet, of information regarding the presence or absence of an important packet or information regarding a resource in which notification of control information of the packet is provided, via the important data notification area. The terminal device 200-2 acquires information regarding the presence or absence of the important packet notification of which is provided from the terminal device 200-1 by decoding the important data notification area. The terminal device 200-2 decides the presence or absence of the packet of the important data on the basis of the acquired information, and decodes the subsequent control information and data if the transmission of the packet of the important data is confirmed. Furthermore, the terminal device 200-2 may not perform decoding of the subsequent control information and data in a case where the transmission of the packet of the important data is not confirmed.

Figure 17:
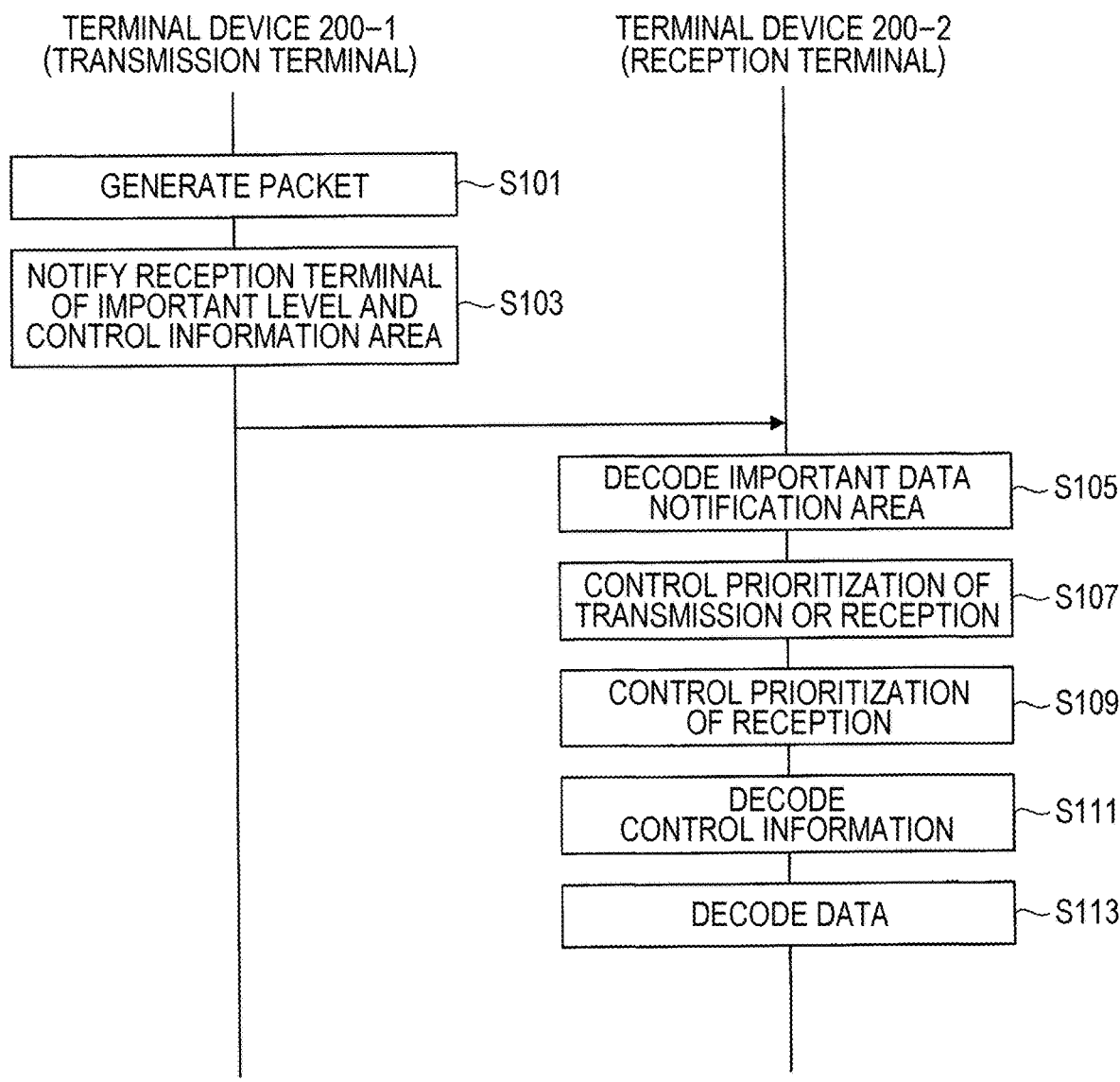
FIG. 17 is a sequence diagram illustrating an example of a flow of processing of the system according to the embodiment.

Here, an example of a notification of information from the terminal device 200-1 (transmission terminal) to the terminal device 200-2 (reception terminal) and an operation of the terminal device 200-2 that has received the notification will be described with reference to FIG. 17. FIG. 17 is a sequence diagram illustrating an example of a flow of processing of the system according to the present embodiment, and illustrates an example of a notification of information from the transmission terminal to the reception terminal and an example of an operation on a reception terminal side that has received the notification.

As illustrated in FIG. 17, if a target packet to be transmitted is generated (S101), the terminal device 200-1 (notification unit 247) notifies the terminal device 200-2, which is the transmission destination of the packet, of information regarding the presence or absence of an important packet or information regarding a resource in which notification of control information of the packet is provided, via the important data notification area (S103). At this time, the terminal device 200-1 may notify the terminal device 200-2 of information such as an importance level, a priority level, or the like of the target packet as the information regarding the presence or absence of the important packet. Then, the terminal device 200-1 (communication control unit 241) transmits a packet of target data via the resource notification of which is provided by the control information described above.

The terminal device 200-2 (information acquisition unit 243) acquires information regarding the presence or absence of the important packet notification of which is provided from the terminal device 200-1 by decoding the important data notification area (S105). The terminal device 200-2 (communication control unit 241) determines whether to prioritize the reception of the packet or the transmission of the packet on the basis of the acquired information, and controls an operation related to the transmission or the reception of the packet according to a result of the determination (S107).

Figure 18:
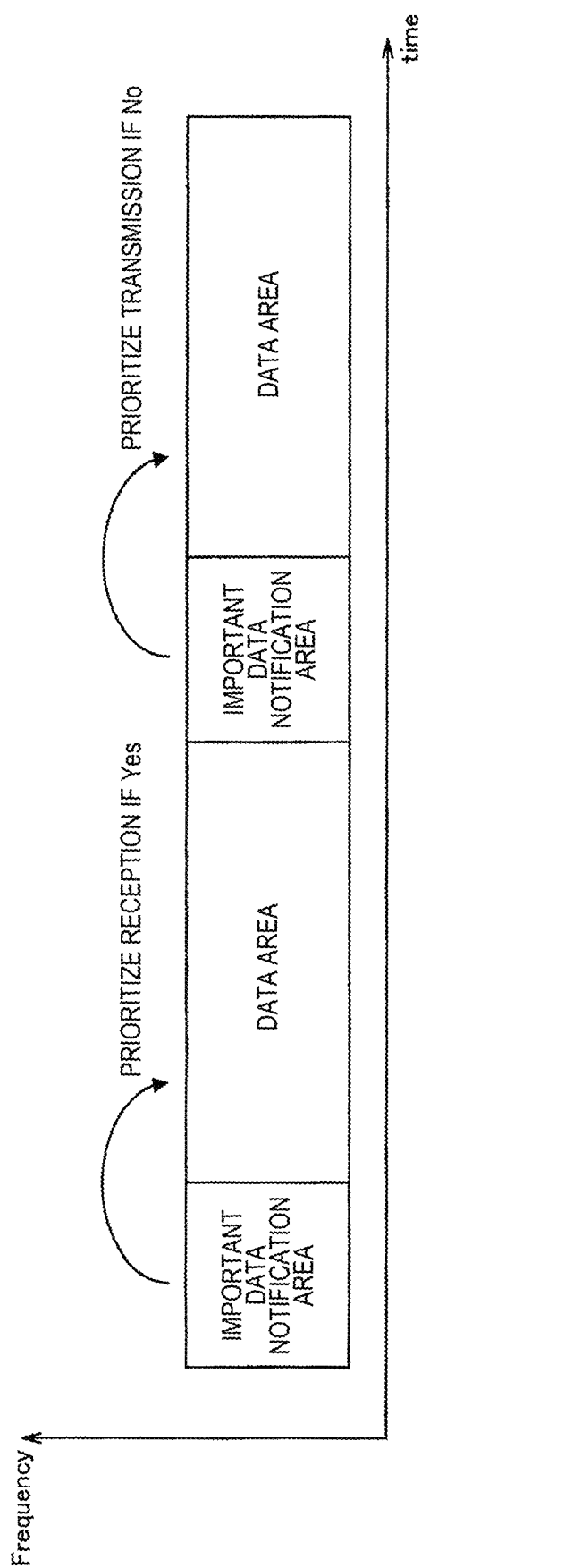
FIG. 18 is an explanatory diagram for describing an outline of an example of an operation of the terminal device according to information regarding the presence or absence of an important packet.

For example, FIG. 18 is an explanatory diagram for describing an outline of an example of an operation of the terminal device 200 according to information regarding the presence or absence of an important packet. Specifically, the terminal device 200-2 (reception terminal) may prioritize the reception of the packet in a case where the terminal device 200-2 recognizes that the important packet is included. In this case, the terminal device 200-2 may restrict an operation related to the transmission of the packet to another terminal device 200. Furthermore, the terminal device 200-2 may prioritize the transmission of the packet in a case where the terminal device 200-2 recognizes that the important packet is not included. In this case, the terminal device 200-2 may restrict an operation related to the reception of the packet transmitted from the terminal device 200-1 (transmission terminal).

Furthermore, in a case where the terminal device 200-2 (communication control unit 241) determines that the reception of the packet is prioritized, the terminal device 200-2 (communication control unit 241) may determine which of packets transmitted by each of the other terminal devices 200 including the terminal device 200-1 is prioritized and control an operation related to the reception of the packet according to a result of the determination. Note that it will hereinafter be assumed that the terminal device 200-2 has determined to prioritize the reception of the packet.

The terminal device 200-2 (information acquisition unit 243) that has determined to prioritize the reception of the packet acquires control information by decoding an area of the resource on which an instruction is given on the basis of the notification from terminal device 200-1 (S111). Then, the terminal device 200-2 (communication control unit 241) receives the data transmitted from the terminal device 200-1 by decoding the data area on the basis of the control information (S113).

Figure 19:
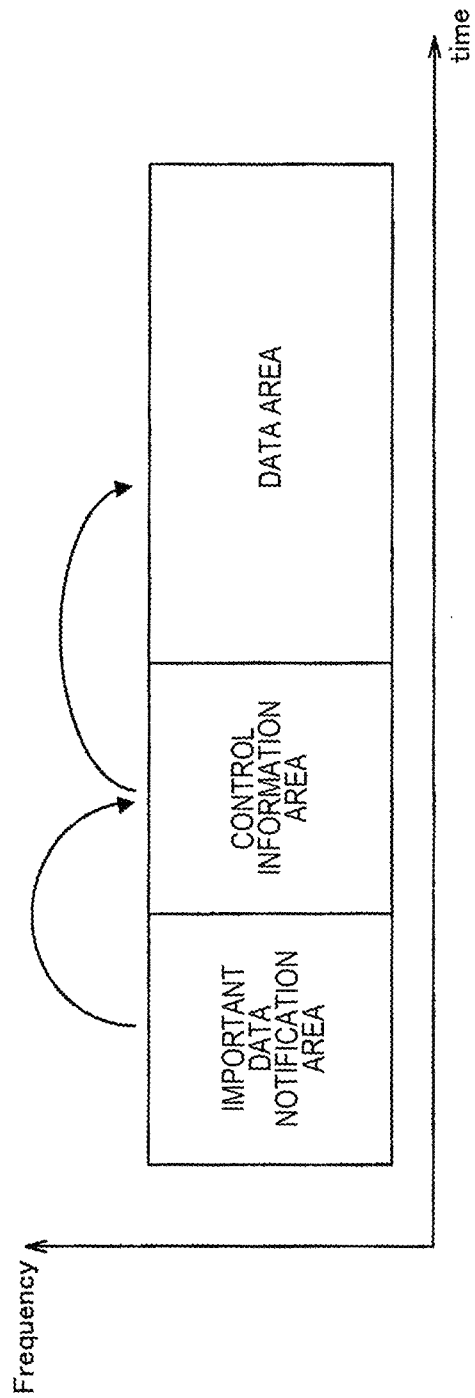
FIG. 19 is an explanatory diagram for describing an outline of processing related to decoding of control information and data by the terminal device according to the embodiment.

For example, FIG. 19 is an explanatory diagram for describing an outline of processing related to decoding of control information and data by the terminal device 200 according to the present embodiment. In the example illustrated in FIG. 19, the important data notification area, a control information area to which the control information is allocated, and the data area to which the data is allocated are individually set. In the important data notification area, information regarding the presence or absence of the important data and information regarding the control information area are set. That is, the terminal device 200-2 (reception terminal) extracts the control information from the control information area by decoding the control information area on the basis of the information set in the important data notification area. Furthermore, the control information includes information regarding the data area. That is, the terminal device 200-2 can decode the data area and receive the data transmitted via the data area, by referring to the data area on the basis of the extracted control information. Note that the important data notification area of an area to which resources are allocated corresponds to an example of a "first partial area" and an area in which notification of information is provided via the first partial area (important data notification area), such as the control information area of the area to which resources are allocated corresponds to an example of a "second partial area".

Furthermore, the terminal device 200-1 (transmission terminal) may inquire of the terminal device 200-2, which is the transmission destination of the packet, whether or not it is possible to perform transmission of the packet. In this case, the terminal device 200-2 (reception terminal) may return information (OK reply) indicating approval to the inquiry from the terminal device 200-1 if the terminal device 200-2 can receive the packet. Then, the terminal device 200-1 starts the transmission of the packet to the terminal device 200-2 in a case where the approval from the terminal device 200-2 is obtained.

Furthermore, the terminal device 200-1 (transmission terminal) may also notify the terminal device 200-2, which is the transmission destination of the packet, of information regarding a resource scheduled to be used for transmission of the packet when the terminal device 200-1 inquires of the terminal device 200-2 whether or not it is possible to perform the transmission of the packet. In this case, the terminal device 200-2 (reception terminal) may determine whether or not the packet transmitted from the terminal device 200-1 can be received via the resource notification of which is provided from the terminal device 200-1.

Furthermore, the terminal device 200-2 (reception terminal) may perform instruction or proposal of the resource to be used for transmission of the packet to the terminal device 200-1 (transmission terminal).

Note that the various operations exemplified in the above may be executed on the basis of a trigger according to a predetermined condition. As a specific example, the various operations described above may be executed in a case where a size of the transmitted data is larger than a threshold value.

Furthermore, in a case where the proposal from the terminal device 200-1 (transmission terminal) is rejected a predetermined number of times or more, the terminal device 200-1 may separately control an operation related to the transmission of the target data (packet). As a specific example, in a case where the proposal related to the transmission of the data is rejected a predetermined number of times or more, the terminal device 200-1 may randomly transmit the data or may drop a packet related to the transmission of the data.

The example of the information of which the terminal device 200-1 (transmission terminal) notifies the terminal device 200-2 (reception terminal) has been described hereinabove. Note that a series of information of which the terminal device 200-1 (transmission terminal) notifies the terminal device 200-2 (reception terminal) described above in advance for the transmission of the packet corresponds to an example of "first information". Furthermore, the information notification of which is provided via the important data notification area corresponds to an example of "second information". Note that the second information can include some information of the first information, such as information regarding the presence or absence of the important data, and the like.

(1-1-2) Notification from Reception Terminal to Transmission Terminal

Next, an example of information of which the terminal device 200-2 (reception terminal) notifies the terminal device 200-1 (transmission terminal) will be described. The terminal device 200-2 may notify another terminal device 200 (for example, the terminal device 200-1) existing in the vicinity of the terminal device 200-2, of, for example, information related to reception of the packet, such as capability information related to the reception of the packet (hereinafter, referred to as "reception capability information"), or the like, in advance. As a specific example, the terminal device 200-2 may periodically notify another terminal device 200 existing in the vicinity of the terminal device 200-2, of the reception capability information as dynamic information. Note that the information regarding the reception of the packet of which the terminal device 200-2 (reception terminal) notifies the terminal device 200-1 (transmission terminal) in advance, such as the reception capability information, corresponds to an example of "third information".

Examples of the reception capability information include the number of receiving antennas, information (for example, an interference rejection combining (IRC) receiver or the like) regarding a receiver, information regarding a receivable resource pool (sub-resource pool), information regarding transmission of a packet, information regarding reception of a packet, and the like.

The information regarding the transmission of the packet corresponds to information regarding transmission of the packet to another terminal device 200 in a case where the terminal device 200-2 operates as a transmission terminal. Examples of the information regarding the transmission of the packet include the following information.

Information regarding buffer of transmission data
Type of transmission data (for example, unicast, broadcast, multicast, or the like)
Information regarding priority or delay request of transmission packet
Information regarding type of traffic related to transmission of packet
Information regarding resource scheduled to be used for transmission of packet and the like.

Furthermore, the information regarding the reception of the packet corresponds to information regarding the reception of the packet transmitted from another terminal device 200 in a case where the terminal device 200-2 operates as a reception terminal. Examples of the information regarding the reception of the packet include the following information.

Number of allowable connections of unicast communication
Number of connections of unicast communication (that is, information indicating how many terminal devices are connected)
Information regarding reception data rate or information regarding reception bit in certain period
Reception rate (information indicating how much resources are received for entire area)
Reception possible rate (information indicating how much resources can be received for entire area)
Type of reception packet (for example, unicast, broadcast, multicast, or the like)
Information regarding priority and delay request of reception packet
. . . and the like.

Note that the information enumerated in the above as the information regarding the reception of the packet may be collectively defined as a reception capability level (in other words, an HD allowable level). In this case, a value of the reception capability level may be defined according to a combination of levels of each of the information listed in the above as the information regarding the reception of the packet. Therefore, another terminal device 200 notified of the reception capability level can recognize the reception capability of the terminal device 200 of a notification source on the basis of the information regarding the reception of the packet associated with the value of the reception capability level.

Furthermore, the terminal device 200-2 (reception terminal) may notify another terminal device 200 (for example, the terminal device 200-1 operating as the transmission terminal) of information regarding a resource capable of receiving the packet. At this time, the terminal device 200-2 (reception terminal) may notify another terminal device 200 of information regarding a time frequency domain of the resource capable of receiving the packet.

The example of the information of which the terminal device 200-2 (reception terminal) notifies the terminal device 200-1 (transmission terminal) has been described hereinabove.

(1-2) Case of Mode3 Resource Allocation

Next, an exchange of information between the terminal devices will be described, focusing on the case of the Mode3 resource allocation. In the case of the Mode3 resource allocation, transmission and reception of information between the terminal devices 200 are performed via, for example, a device having authority regarding control of sidelink communication, such as the base station 100 or the like. Note that the information transmitted and received is similar to the information described above as an example of the Mode4 resource allocation.

Furthermore, the Mode3 resource allocation and the Mode4 resource allocation may be executed in combination. In this case, the example in the case of the Mode3 resource allocation and the example in the case of the Mode4 resource allocation may be applied in combination, to an exchange of information between the terminal devices 200.

(2) Measures after Exchange of Information

Next, an example of measures in each terminal device 200 after the exchange of the information is performed between the terminal devices 200 will be described. Note that in the following description, similarly to a case of exchanging the information between the terminal devices 200, for convenience, a description will be provided, focusing on a case where the terminal device 200-1 (transmission terminal) transmits a packet to the terminal device 200-2 (reception terminal). Furthermore, the terminal device 200-1 may operate as a reception terminal, and the terminal device 200-2 may operate as a transmission terminal.

(2-1) Measures of Terminal Device on Transmitting Side

First, an example of measures of the terminal device 200-1 operating as the transmission terminal will be described.

For example, the terminal device 200-1 (transmission terminal) may control a priority between the transmission of the packet and the reception of the packet according to a result of the exchange of the information with the terminal device 200-2 (reception terminal). That is, the terminal device 200-1 may prioritize the transmission of the packet to the terminal device 200-2 or prioritize the reception of the packet from another terminal device 200, according to the result of the exchange of the information with the terminal device 200-2. Furthermore, the control of the priority may be applied only to communication via a specific resource.

Furthermore, control of a priority according to various conditions as well as the priority of the transmission and the reception may be performed. For example, the terminal device 200-1 may prioritize communication of a particular traffic type. As a specific example, the terminal device 200-1 may prioritize broadcast communication.

Furthermore, the terminal device 200-1 may determine various priorities (for example, a priority of transmission and reception, a priority of a traffic type, or the like) based on the location information on the basis of its own position information and position information of at least one of the other devices (for example, the other terminal devices 200 and the like). Furthermore, another device that uses the position information can correspond to at least one of another terminal device 200, which is a transmission destination of the packet of the terminal device 200-1, or another terminal device 200 transmitting the packet to the terminal device 200-1. As a specific example, the terminal device 200-1 may perform control to prioritize the unicast communication in a case where the terminal device 200-1 has decided that the unicast communication should be prioritized according to a positional relationship between the terminal device 200-1 and another terminal device 200.

Furthermore, the terminal device 200-1 may determine various priorities (for example, a priority of transmission and reception, a priority of a traffic type, or the like) on the basis of a channel busy ratio (CBR). As a specific example, the terminal device 200-1 may prioritize the broadcast because reception of the unicast may become difficult in a case where a channel is busy.

Furthermore, the terminal device 200-1 may determine various priorities (for example, a priority of transmission and reception, a priority of a traffic type, or the like) on the basis of a channel occupancy ratio (CR). The CR is a parameter indicating a ratio of resources occupied by transmission of a target device. As a specific example, the terminal device 200-1 may perform control so that a frequency of reception becomes higher so as to further reduce the CR in a case where many resources are occupied, such that the CR becomes higher (for example, in a case where the CR is a threshold value or more).

Furthermore, the terminal device 200-1 (transmission terminal) may change a transmission schedule of a transmission packet according to the result of the exchange of the information with the terminal device 200-2 (reception terminal). As a specific example, the terminal device 200-1 may decide whether or not to drop the packet scheduled to be transmitted in a case where it is difficult to satisfy a delay request of the transmission packet, or the like. Furthermore, the terminal device 200-1 may stop continuous transmission and perform intermittent transmission.

Furthermore, the terminal device 200-1 (transmission terminal) may change a transmission method of a transmission packet according to the result of the exchange of the information with the terminal device 200-2 (reception terminal). As a specific example, the terminal device 200-1 may change control of a modulation coding scheme (MCS), a transmission power, MIMO transmission, and the like. Furthermore, the terminal device 200-1 may perform transmission in a short time by temporarily switching to high data rate communication.

Furthermore, the terminal device 200-1 (transmission terminal) may drop the packet according to the priority or a condition of the delay request. As a specific example, the terminal device 200-1 may compare priority information of transmission and reception packets in the terminal device 200-2 (reception terminal) with priority information of a packet scheduled to be transmitted by the terminal device 200-1 to decide whether or not to drop the packet scheduled to be transmitted. Furthermore, the terminal device 200-1 may abandon the transmission and drop the packet, in a case where it is difficult to satisfy the delay request of the transmission packet.

Furthermore, the terminal device 200-1 (transmission terminal) may instruct the terminal device 200-2 to release a unicast link according to the result of the exchange of the information with the terminal device 200-2 (reception terminal). As a specific example, the terminal device 200-1 may instruct the terminal device 200-2 to release the unicast link according to a determination result of the various priorities (for example, the priority of the transmission and the reception, and the like).

Furthermore, the terminal device 200-1 (transmission terminal) may switch to multi-carrier communication according to the result of the exchange of the information with the terminal device 200-2 (reception terminal). As a specific example, the terminal device 200-1 may switch to multi-carrier communication according to the determination result of the various priorities (for example, the priority of the transmission and the reception, and the like). In this case, the terminal device 200-1 may request the device having the authority regarding the control of the sidelink communication, such as the base station 100 or the like to configure a resource.

Furthermore, the terminal device 200-1 (transmission terminal) may change a frequency band (transmission band) used for transmission of the packet according to the result of the exchange of the information with the terminal device 200-2 (reception terminal). As a specific example, the terminal device 200-1 may change a frequency band (transmission band) used for transmission of the packet according to the determination result of the various priorities (for example, the priority of the transmission and the reception, and the like). In such a case, the terminal device 200-1 may notify the terminal device 200-2, which is the transmission destination of the packet, of information regarding the changed frequency band.

Furthermore, the terminal device 200-1 (transmission terminal) may switch from direct communication with the terminal device 200-2 to communication via the base station 100 or the like according to the result of the exchange of the information with the terminal device 200-2 (reception terminal). As a specific example, the terminal device 200-1 may switch a communication path with the terminal device 200-2, as described above, according to the determination result of the various priorities (for example, the priority of the transmission and the reception, and the like). In such a case, the terminal device 200-1 may notify the terminal device 200-2, which is the transmission destination of the packet, of the switching of the communication path. Upon receiving this notification, the terminal device 200-2 may receive the packet transmitted from the terminal device 200-1 via the base station 100. Furthermore, the terminal device 200-1 may request the device having the authority regarding the control of the sidelink communication, such as the base station 100 or the like to switch a link.

Furthermore, the terminal device 200-1 (transmission terminal) may perform reservation of a resource for the terminal device 200-2 to receive the packet transmitted by the terminal device 200-1 itself according to the result of the exchange of the information with the terminal device 200-2 (reception terminal). As a specific example, the terminal device 200-1 may perform the reservation of the resource described above according to the determination result of the various priorities (for example, the priority of the transmission and the reception, and the like).

Specifically, the terminal device 200-1 may perform parsing and transmission of the packet. In this case, the terminal device 200-1 may perform instruction of the resource for the terminal device 200-2 to receive the packet transmitted by the terminal device 200-1 for the terminal device 200-2. At this time, the terminal device 200-2 may notify the terminal device 200-1 of approval (OK) or rejection (NG) of reception in response to the instruction from the terminal device 200-1. Note that in a case where the terminal device 200-2 has notified the terminal device 200-1 of the approval (OK) in response to the instruction from the terminal device 200-1, the terminal device 200-2 receives the packet transmitted from the terminal device 200-1 via the resource on which an instruction is given.

The example of the measures of the terminal device 200-1 operating as the transmission terminal has been described hereinabove. Note that in a case of focusing on the communication between the terminal device 200-1 (transmission terminal) and the terminal device 200-2 (reception terminal), the terminal device 200-2 with respect to the terminal device 200-1 corresponds to an example of a "third communication device". Furthermore, another terminal device 200 (for example, a terminal device 200 other than the terminal device 200-2), which is a transmission source of the packet in a case where the terminal device 200-1 operates as the reception terminal, corresponds to an example of a "fourth communication device".

(2-2) Measures of Device Corresponding to Base Station

Next, an example of measures of the device having the authority regarding the control of the sidelink communication, such as the base station 100 or the like will be described. Note that in the present section, for convenience, a description will be provided focusing on a case where the base station 100 takes measures, but the same applies to another device (for example, an RSU, a relay node, a relay terminal, or a master terminal (reader terminal or the like) having authority regarding control of the sidelink communication as well as the base station 100 as long as there is no technical discrepancy.

For example, the base station 100 may control resource scheduling of the sidelink. As a specific example, the base station 100 may decide whether or not to cause the terminal device 200-1 (transmission terminal) to drop the packet scheduled to be transmitted in a case where it is difficult to satisfy a delay request of the transmission packet, or the like. Furthermore, the base station 100 may cause the terminal device 200-1 to stop continuous transmission and perform intermittent transmission.

Furthermore, the base station 100 (transmission terminal) may cause the terminal device 200-1 (transmission terminal) to drop the packet according to the priority or a condition of the delay request. As a specific example, the base station 100 may compare priority information of transmission and reception packets in the terminal device 200-2 (reception terminal) with priority information of a packet scheduled to be transmitted by the terminal device 200-1 (transmission terminal) to decide whether or not to cause the terminal device 200-1 to drop the packet. Furthermore, the base station 100 may cause the terminal device 200-1 to abandon the transmission and drop the packet, in a case where it has been decided that it is difficult to satisfy the delay request of the transmission packet.

Furthermore, the base station 100 may instruct the terminal device 200-2 (reception terminal) to release the unicast link.

Furthermore, the base station 100 may switch the communication between the terminal device 200-1 (transmission terminal) and the terminal device 200-2 (reception terminal) to multi-carrier communication.

Furthermore, the base station 100 may change a frequency band used for transmission of the packet between the terminal device 200-1 (transmission terminal) and the terminal device 200-2 (reception terminal). In this case, the base station 100 may notify at least the terminal device 200-2 of information regarding the changed frequency band.

The example of the measures of the device having the authority regarding the control of the sidelink communication, such as the base station 100 or the like has been described hereinabove.

(2-3) Measures of Terminal Device on Receiving Side

Next, an example of measures of the terminal device 200-2 operating as the reception terminal will be described.

For example, the terminal device 200-2 (reception terminal) may control resource scheduling of the sidelink according to the result of the exchange of the information with the terminal device 200-1 (transmission terminal). As a specific example, the terminal device 200-2 may decide whether or not to cause the terminal device 200-1 to drop the packet scheduled to be transmitted in a case where it is difficult to satisfy the delay request of the transmission packet, or the like. Furthermore, the terminal device 200-2 may cause the terminal device 200-1 to stop continuous transmission and perform intermittent transmission. Furthermore, the terminal device 200-2 (reception terminal) may control an operation related to transmission of data to another terminal device 200 in a case where the terminal device 200-2 operates as a transmission terminal, according to its own situation. As a specific example, the terminal device 200-2 (reception terminal) may decide whether or not to drop a packet scheduled to be transmitted to another terminal device 200 in a case where the terminal device 200-2 operates as the transmission terminal, under a situation where it is difficult to satisfy the delay request described above.

Furthermore, the terminal device 200-2 (reception terminal) may cause the terminal device 200-1 (transmission terminal) to drop the packet according to the priority or the condition of the delay request. As a specific example, the terminal device 200-2 may compare priority information of a packet scheduled to be transmitted by the terminal device 200-1 (transmission terminal) with priority information of transmission and reception packets in the terminal device 200-2 itself to decide whether or not to cause the terminal device 200-1 to drop the packet scheduled to be transmitted. Furthermore, the terminal device 200-2 may cause the terminal device 200-1 to abandon the transmission and drop the packet, in a case where it is difficult to satisfy the delay request of the transmission packet. Furthermore, the terminal device 200-2 (reception terminal) may decide whether or not to drop the packet scheduled to be transmitted to another terminal device 200 in a case where the terminal device 200-2 operates as the transmission terminal, according to a result of the comparison.

Furthermore, the terminal device 200-2 (reception terminal) may release a unicast link according to the result of the exchange of the information with the terminal device 200-1 (transmission terminal). As a specific example, the terminal device 200-2 may release a unicast link with another terminal device 200 that has already been established.

Furthermore, the terminal device 200-2 (reception terminal) may switch to multi-carrier communication according to the result of the exchange of the information with the terminal device 200-1 (transmission terminal).

Furthermore, the terminal device 200-2 (reception terminal) may change a frequency band used for communication with the terminal device 200-1 (that is, a frequency band for receiving the packet transmitted from the terminal device 200-1) according to the result of the exchange of the information with the terminal device 200-1 (transmission terminal). In this case, the terminal device 200-2 may acquire information regarding the changed frequency band from the terminal device 200-1.

Furthermore, the terminal device 200-2 (reception terminal) may switch from direct communication with the terminal device 200-1 to communication via the base station 100 or the like according to the result of the exchange of the information with the terminal device 200-1 (transmission terminal). In this case, the terminal device 200-2 may recognize the switching of the communication path according to the notification from the terminal device 200-1.

Furthermore, the terminal device 200-2 (reception terminal) may notify the terminal device 200-1 of the resource capable of receiving the packet according to the result of the exchange of the information with the terminal device 200-1 (transmission terminal). Note that in this case, the terminal device 200-2 receives the packet transmitted from the terminal device 200-1 via the resource notification of which is provided. Furthermore, the terminal device 200-2 may notify the terminal device 200-1 of a time when the packet can be received. Furthermore, the terminal device 200-2 may notify the terminal device 200-1 of an area of a time and a frequency in which the packet can be received.

Furthermore, the terminal device 200-2 may perform instruction or allocation of resources capable of receiving packets, individually on each of terminal devices 200 scheduled to transmit the packets to the terminal device 200-2 itself.

The example of the measures of the terminal device 200-2 operating as the reception terminal has been described hereinabove. Note that in a case of focusing on the communication between the terminal device 200-1 (transmission terminal) and the terminal device 200-2 (reception terminal), the terminal device 200-1 with respect to the terminal device 200-2 corresponds to an example of a "first communication device". Furthermore, another terminal device 200 (for example, a terminal device 200 other than the terminal device 200-1), which is a transmission destination of the packet in a case where the terminal device 200-2 operates as the transmission terminal, corresponds to an example of a "second communication device".

5.2. Classification of Resources of Sidelink into Levels

Next, as an example of the technology capable of suppressing the emergence of the HD problem, a technology of suppressing the emergence of the HD problem by classifying resources of the sidelink into levels will be described.

For example, by classifying target resources to be monitored by the terminal device 200 into levels, the terminal device 200 may control processing related to transmission or reception of the packet according to levels set for the target resources. As a specific example, the terminal device 200 may more preferentially perform reception on a resource area for which a set level becomes higher.

The classification of the resources into the levels may be performed on the entire system. In this case, setting of the level may be performed by the device having the authority regarding the control of the sidelink communication, such as the base station 100 or the like or may be performed by preconfiguration. Furthermore, the setting of the level may be performed for every frequency band. Furthermore, the setting of the level may be performed between the terminal devices 200 that perform the transmission and the reception.

Furthermore, the classification of the resources into the levels may be set individually for every terminal device 200. In this case, the terminal device 200 may notify another terminal device 200 located in the vicinity of the terminal device 200, of information regarding the setting for terminal device 200 itself in advance.

Furthermore, as another example, ratios of transmission and reception may be classified into levels. As a specific example, a ratio of a transmission traffic may be classified into levels for every resource pool.

Figure 20:
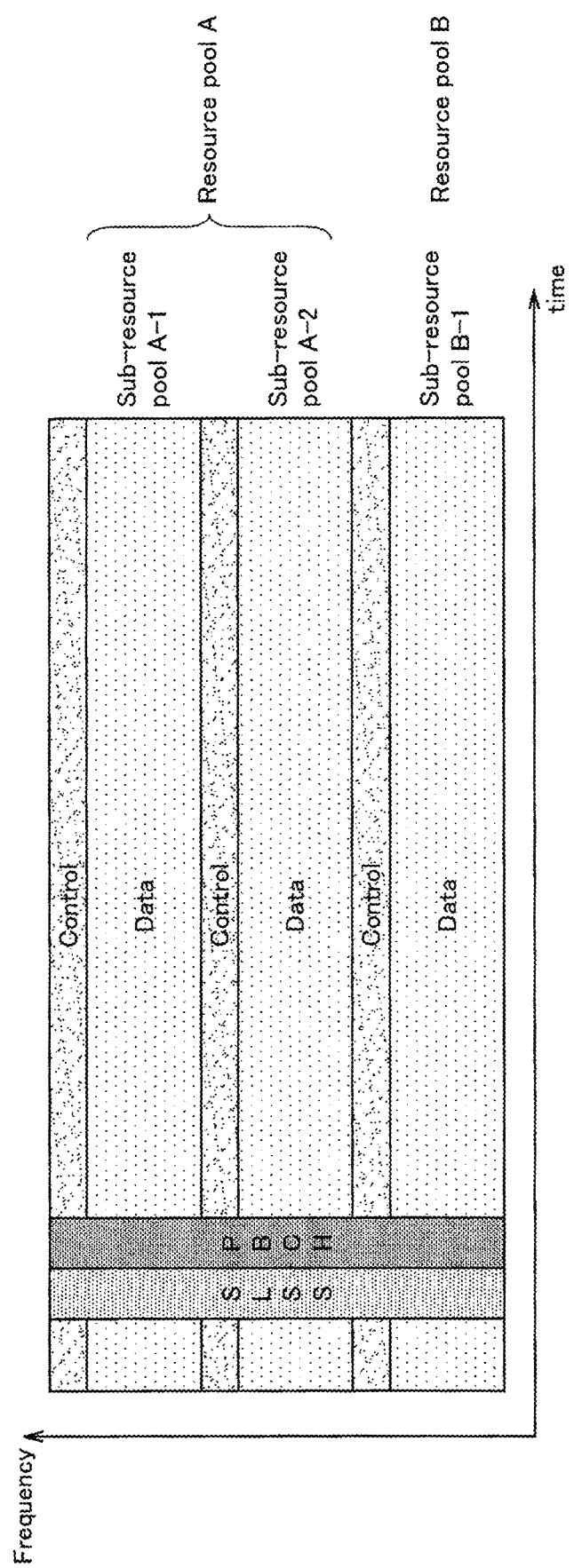
FIG. 20 is an explanatory diagram for describing an example of classification of ratios of transmission and reception into levels.

For example, FIG. 20 is an explanatory diagram for describing an example of classification of ratios of transmission and reception into levels. In FIG. 20, a horizontal axis represents a time, and a vertical axis represents a frequency. "SLSS" indicates a sidelink synchronization signal. "PBCH" indicates a physical sidelink broadcast channel. "Control" schematically indicates a control channel, and corresponds to, for example, a physical sidelink control channel (PSCCH). "Data" schematically indicates a data channel, and corresponds to, for example, a physical sidelink shared channel (PSSCH). Note that an area to which the control channel is allocated, of an area to which resources are allocated corresponds to an example of a "control area" and an area to which the data channel is allocated, of the area to which the resources are allocated corresponds to an example of a "data area".

In the example illustrated in FIG. 20, "Resource pool A" and "Resource pool B" are set as resource pools available for the sidelink communication. Furthermore, in the "Resource pool A", "Sub-resource pool A-1" and "Sub-resource pool A-2" are defined as sub-resource pools. Furthermore, in the "Resource pool B", "Sub-resource pool B-1" is defined as a sub-resource pool. On the basis of such a configuration, for example, different levels may be set in terms of the ratios of the transmission and the reception, in the "Resource pool A" and the "Resource pool B". As a more specific example, a ratio of unicast may be defined as 90% and a ratio of broadcast may be defined as 10%, for the "Resource pool A". On the other hand, a ratio of unicast may be defined as 10% and a ratio of broadcast may be defined as 90%, for the "Resource pool B". On the basis of such a premise, for example, in a case where the terminal device 200-1 (transmission terminal) holds a unicast packet, the terminal device 200-1 may operate so as to transmit the packet using the "Resource pool A" with a probability of 90%. Furthermore, the classification of the ratios of the transmission and the reception into the levels described above may be set individually for every important level of the packet.

5.3. Example

Next, examples of the system according to the embodiment of the present disclosure will be described.

Figure 21:
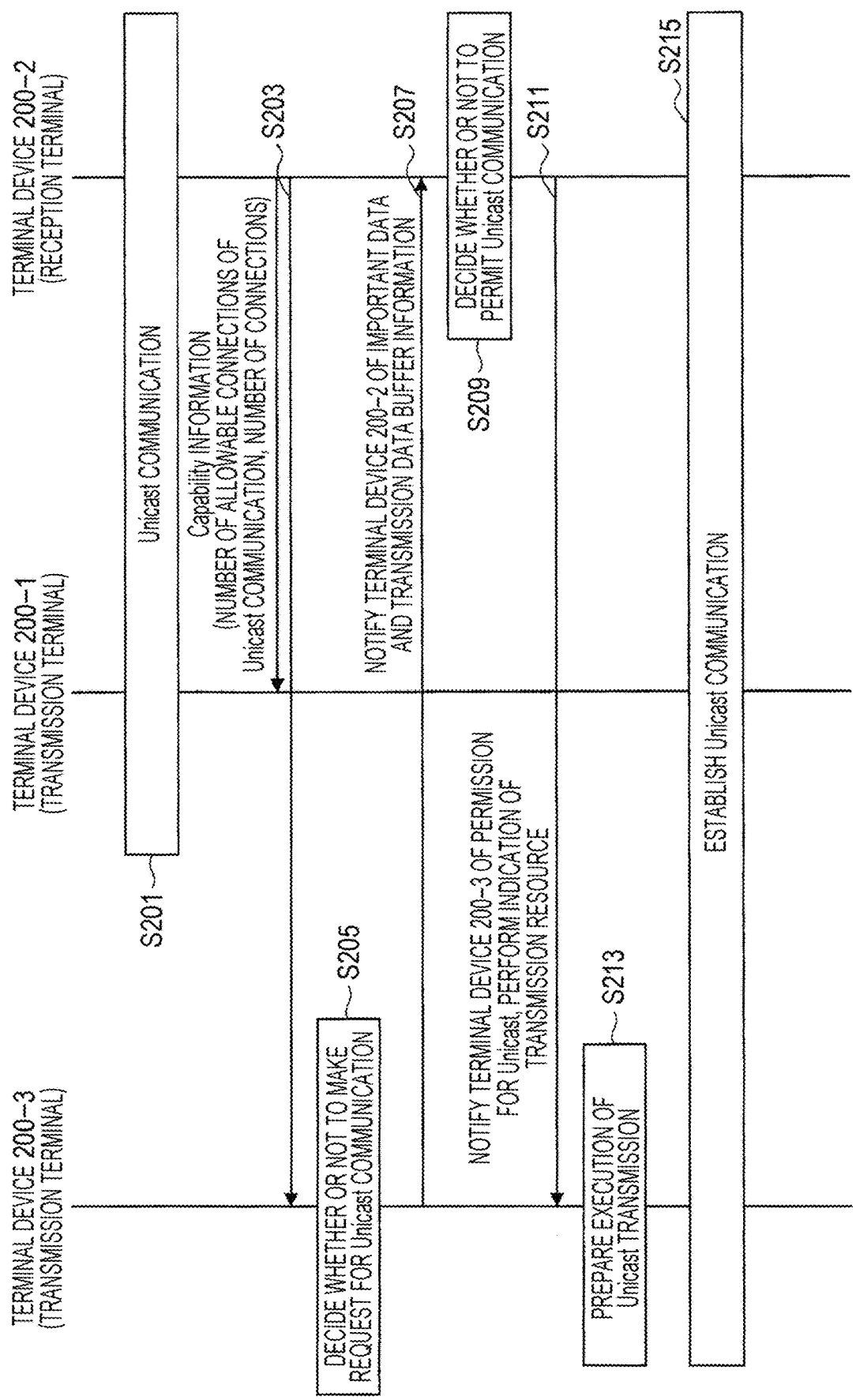
FIG. 21 is a sequence diagram illustrating an example of a flow of a series of processing of a system according to Example 1.

5.3.1. Example 1: First Example of Operation Related to Addition of Unicast Link First, as Example 1, an example of a flow of processing for newly adding a unicast link in inter-terminal communication via a sidelink will be described. For example, FIG. 21 is a sequence diagram illustrating an example of a flow of a series of processing of a system according to Example 1. Specifically, in the example illustrated in FIG. 21, while a terminal device 200-1 (transmission terminal) and a terminal device 200-2 (reception terminal) are performing unicast communication (S201), a terminal device 200-3 (transmission terminal) is trying to newly set a unicast link with the terminal device 200-2 (reception terminal).

The terminal device 200-2 periodically notifies the surrounding terminal devices 200 (for example, the terminal devices 200-1 and 200-3) of capability information of the terminal device 200-2 (S203). Examples of the capability information include information such as the number of allowable connections of unicast communication, the number of connections of unicast communication, or the like. Therefore, each of the terminal devices 200-1 and 200-3 can recognize how much capability the terminal device 200-2 has with respect to communication with the other terminal devices 200.

The terminal device 200-3 decides whether or not to make a request to the terminal device 200-2 for unicast communication on the basis of the capability information notification of which is provided from the terminal device 200-2 (S205). At this time, the terminal device 200-3 may decide whether or not to make a request for the unicast communication in consideration of, for example, a priority of a packet scheduled to be transmitted to the terminal device 200-2, a traffic volume (for example, a traffic volume of communication via the sidelink), or the like. In the example illustrated in FIG. 21, a case where the terminal device 200-3 has decided to make a request to the terminal device 200-2 for the unicast communication is illustrated. That is, the terminal device 200-3 notifies the terminal device 200-2 of information regarding the presence or absence of important data, information regarding a buffer of transmission data, or the like to make a request to the terminal device 200-2 for the unicast communication (S207).

If the terminal device 200-2 receives the request for the unicast communication from the terminal device 200-3, the terminal device 200-2 decides whether or not to permit the unicast communication for the terminal device 200-3 on the basis of the information notification of which is provided together (S209). Note that in the example illustrated in FIG. 21, a case where the terminal device 200-2 has decided to permit the unicast communication for the terminal device 200-3 is illustrated. That is, the terminal device 200-2 notifies the terminal device 200-3 of the permission for the unicast communication. Furthermore, at this time, the terminal device 200-2 may perform instruction of a transmission resource so that the terminal device 200-3 transmits a packet using a resource orthogonal to the terminal device 200-1 in consideration of arrival of a packet from terminal device 200-1 (S211).

If the terminal device 200-3 receives the notification of the permission for the unicast communication from the terminal device 200-2, the terminal device 200-3 starts processing related to the unicast communication with the terminal device 200-2 (S213), and establishes a link of the unicast communication with the terminal device 200-2 (S215). Note that at this time, the terminal device 200-3 may establish a link of the unicast communication with the terminal device 200-2 so that the packet is transmitted via the transmission resource on which an instruction is given by the terminal device 200-2.

As Example 1, an example of a flow of processing for newly adding a unicast link in inter-terminal communication via a sidelink has been described with reference to FIG. 21 hereinabove.

Figure 22:
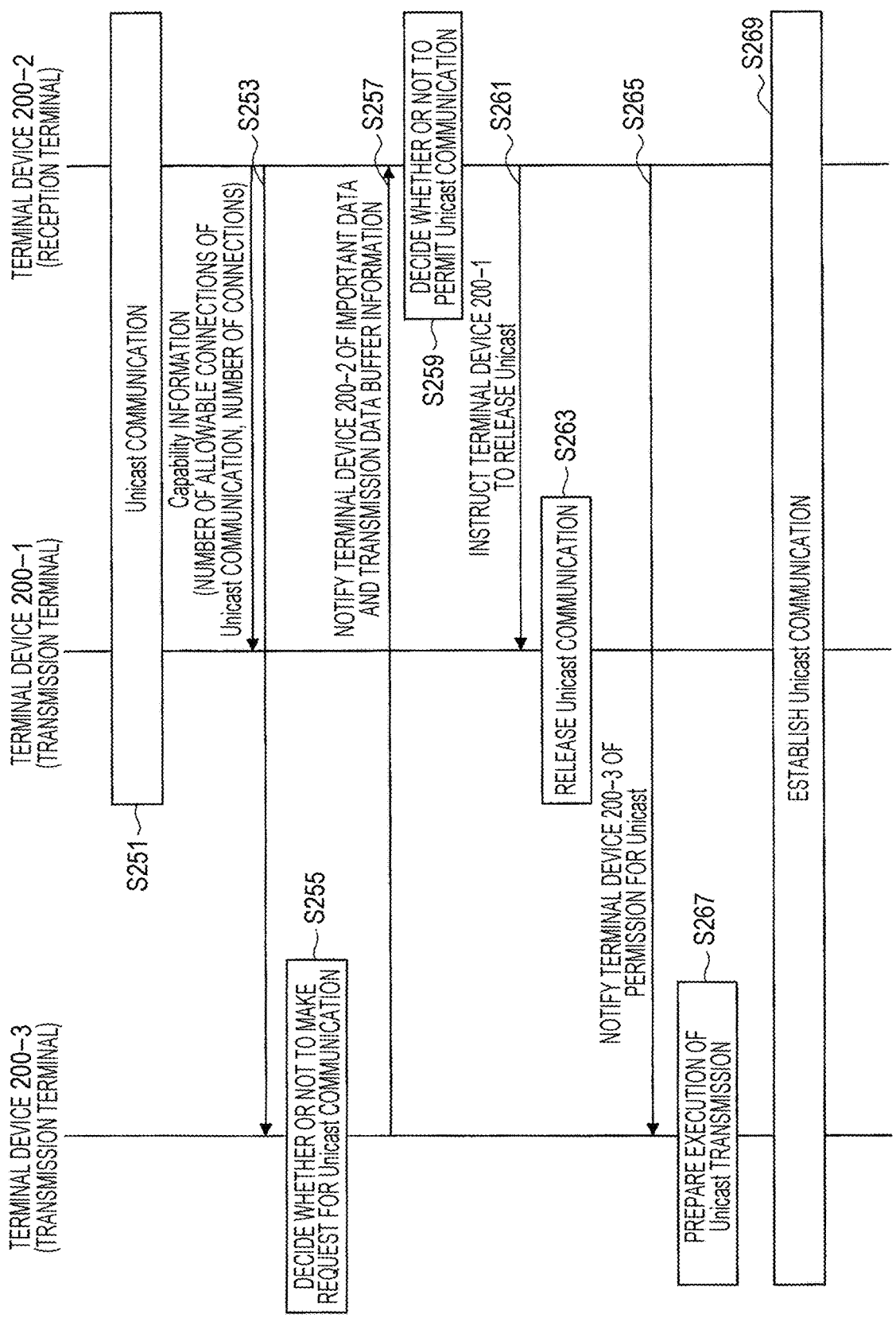
FIG. 22 is a sequence diagram illustrating an example of a flow of a series of processing of a system according to Example 2.

5.3.2. Example 2: Second Example of Operation Related to Addition of Unicast Link Next, as Example 2, another example of a flow of processing for newly adding a unicast link in inter-terminal communication via a sidelink will be described. For example, FIG. 22 is a sequence diagram illustrating an example of a flow of a series of processing of a system according to Example 2. Specifically, in the example illustrated in FIG. 22, similarly to the example illustrated in FIG. 21, while a terminal device 200-1 (transmission terminal) and a terminal device 200-2 (reception terminal) are performing unicast communication (S251), a terminal device 200-3 (transmission terminal) is trying to newly set a unicast link with the terminal device 200-2 (reception terminal). Note that processing illustrated by reference numerals S251 to S257 in FIG. 22 are substantially similar to the processing illustrated by reference numerals S201 to S207 in the example illustrated in FIG. 21, and a detailed description thereof will thus be omitted.

If the terminal device 200-2 receives the request for the unicast communication from the terminal device 200-3, the terminal device 200-2 decides whether or not to permit the unicast communication for the terminal device 200-3 on the basis of the information notification of which is provided together (S209). Note that in the example illustrated in FIG. 22, an example of a case where the terminal device 200-2 preferentially communicates with the terminal device 200-3 over the terminal device 200-1 is illustrated.

Specifically, in the example illustrated in FIG. 22, the terminal device 200-2 instructs the terminal device 200-1 to release the unicast communication (S261). Upon receiving the instruction from the terminal device 200-2, the terminal device 200-1 releases the unicast communication with the terminal device 200-2 (S263).

Next, the terminal device 200-2 notifies the terminal device 200-3 of the permission for the unicast communication (S265).

If the terminal device 200-3 receives the notification of the permission for the unicast communication from the terminal device 200-2, the terminal device 200-3 starts processing related to the unicast communication with the terminal device 200-2 (S267), and establishes a link of the unicast communication with the terminal device 200-2 (S269).

Figure 23:
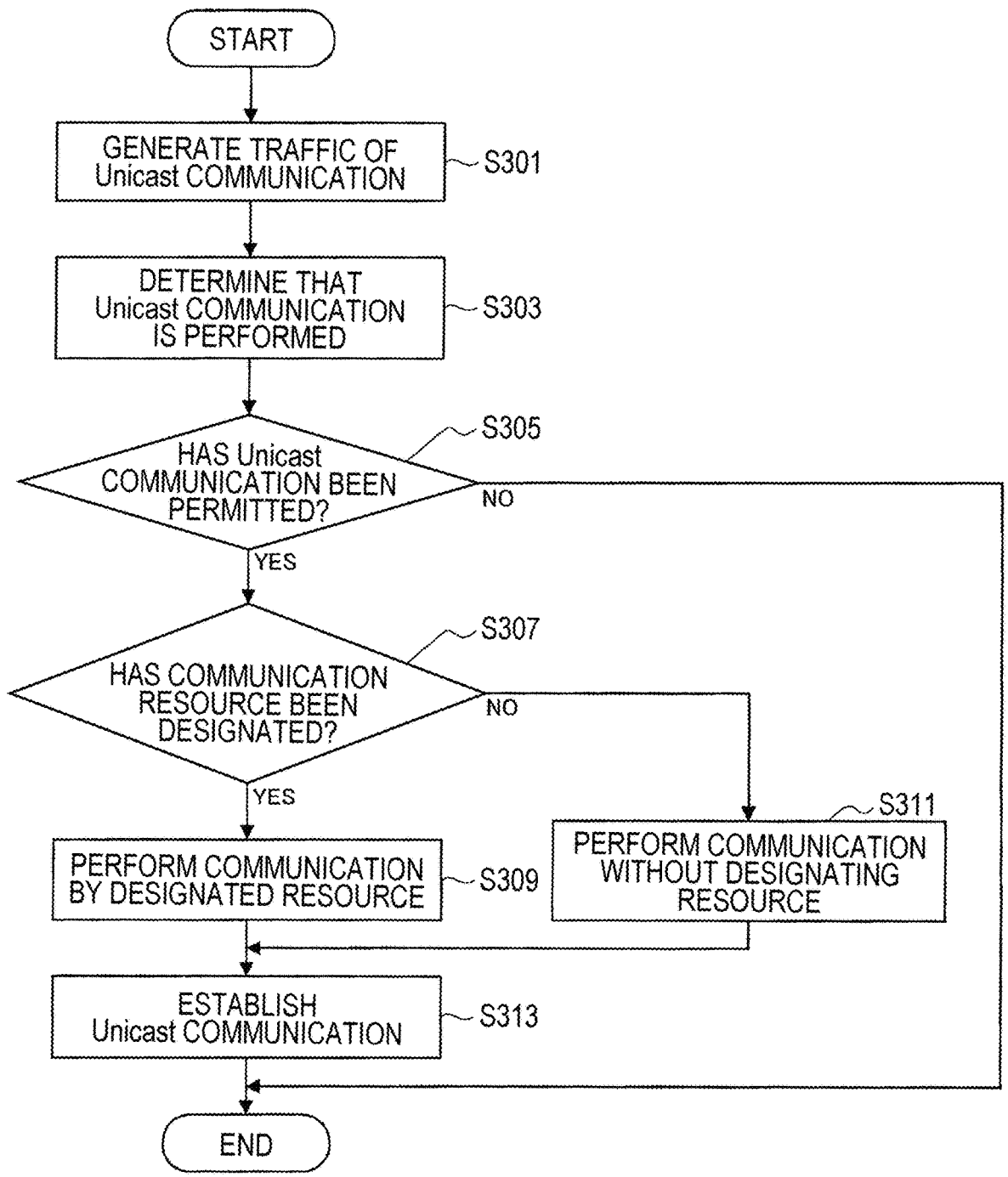
FIG. 23 is a flowchart illustrating an example of a flow of a series of processing of a terminal device operating as a transmission terminal in the system according to Example 2.

Here, an example of a flow of a series of processing of the terminal device 200-3 (transmission terminal) will be described with reference to FIG. 23. FIG. 23 is a flowchart illustrating an example of a flow of a series of processing of the terminal device 200-3 operating as the transmission terminal in the system according to Example 2.

As illustrated in FIG. 23, if a traffic of the unicast communication is generated (S301), the terminal device 200-3 decides whether or not to make a request to the terminal device 200-2 (reception terminal) for the unicast communication. The terminal device 200-3 makes a request to the terminal device 200-2 for the unicast communication according to a result of the decision described above, and determines whether or not the unicast communication can be performed according to a response from the terminal device 200-2 (S303).

In a case where the unicast communication has been permitted from the terminal device 200-2 (S305: YES), the terminal device 200-3 confirms whether or not a resource to be used for communication has been designated from the terminal device 200-2 (S305). In a case where the resource has been designated from the terminal device 200-2 (S305: YES), the terminal device 200-3 performs control so that the designated resource is used for communication with the terminal device 200-2 (S307). On the other hand, in a case where the resource has not been designated from the terminal device 200-2 (S305: NO), the terminal device 200-3 controls communication with the terminal device 200-2 without designating a resource (S309). In such a manner, the terminal device 200-3 establishes the unicast communication with the terminal device 200-2 (S311).

On the other hand, in a case where the unicast communication has not been permitted from the terminal device 200-2 (S305: NO), the terminal device 200-3 ends a series of processing without establishing the unicast communication with the terminal device 200-2. Note that in this case, the terminal device 200-3 may perform communication with the terminal device 200-2 using a means (for example, communication via the base station 100, or the like) other than unicast communication.

Figure 24:
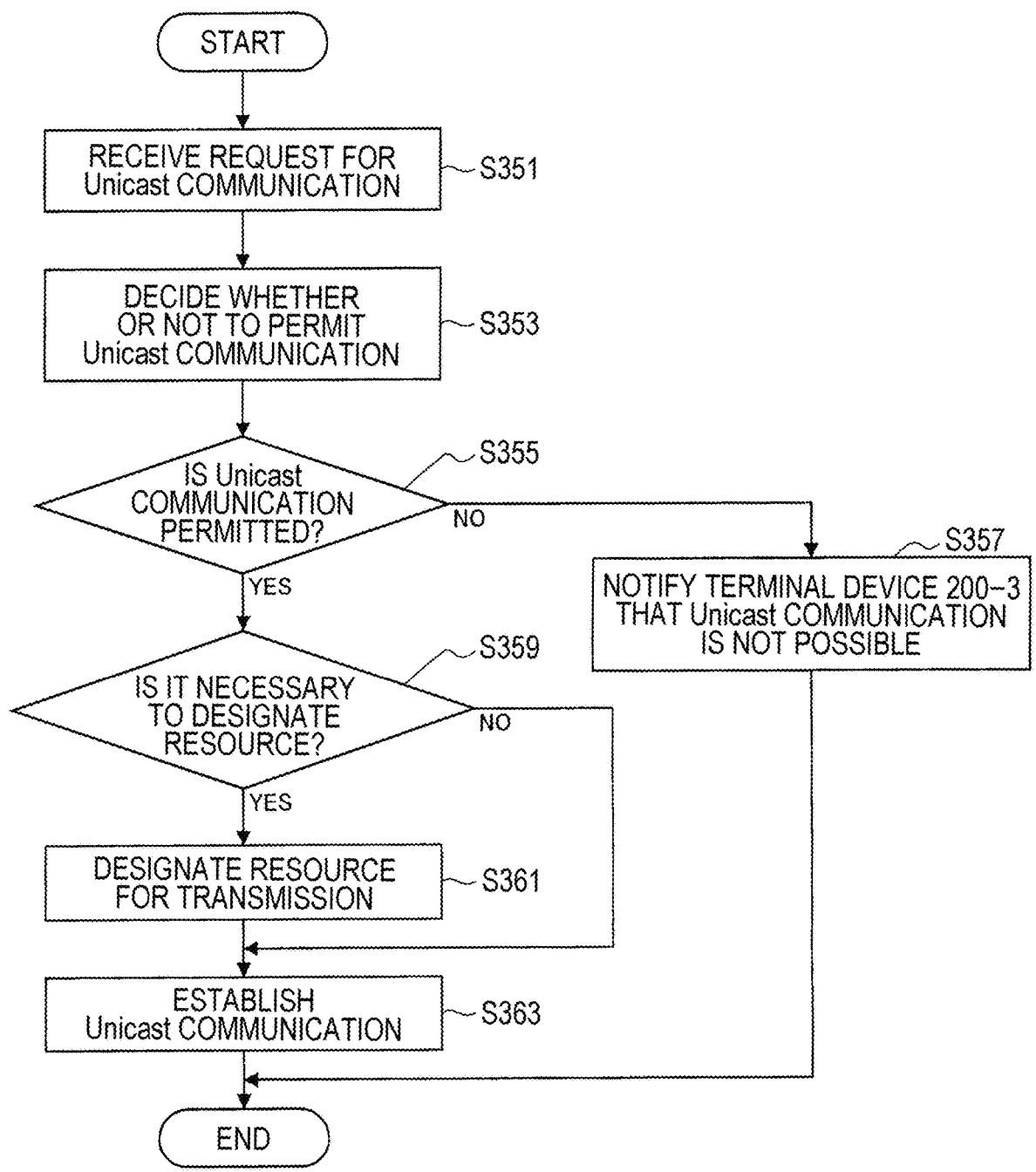
FIG. 24 is a flowchart illustrating an example of a flow of a series of processing of a terminal device operating as a reception terminal in the system according to Example 2.

Next, an example of a flow of a series of processing of the terminal device 200-2 (reception terminal) will be described with reference to FIG. 24. FIG. 24 is a flowchart illustrating an example of a flow of a series of processing of the terminal device 200-2 operating as the reception terminal in the system according to Example 2.

If the terminal device 200-2 receives the request for the unicast communication from the terminal device 200-3 (transmission terminal) (S351), the terminal device 200-2 decides whether or not to permit the unicast communication for the terminal device 200-3 (S353).

In a case where the terminal device 200-2 decides to permit the unicast communication for the terminal device 200-3 (S355: YES), the terminal device 200-2 decides whether or not it is necessary to designate a resource for the terminal device 200-3 to transmit the packet (S359). In a case where the terminal device 200-2 decides that it is necessary to designate the resource (S359: YES), the terminal device 200-2 designates the resource to be used for transmission of the packet to the terminal device 200-3 (S361). On the other hand, in a case where the terminal device 200-2 decides that it is not necessary to designate the resource (S359: NO), the terminal device 200-2 may not designate the resource to be used for transmission of the packet to the terminal device 200-3. Then, the terminal device 200-2 notifies the terminal device 200-3 of the permission for the unicast communication, and establishes the unicast communication with the terminal device 200-3 (S363).

On the other hand, in a case where the terminal device 200-2 decides not to permit the unicast communication for the terminal device 200-3 (S355: NO), the terminal device 200-2 notifies the terminal device 200-3 that the unicast communication is not possible (S357).

As Example 2, another example of a flow of processing for newly adding a unicast link in inter-terminal communication via a sidelink has been described with reference to FIGS. 22 to 24 hereinabove.

Figure 25:
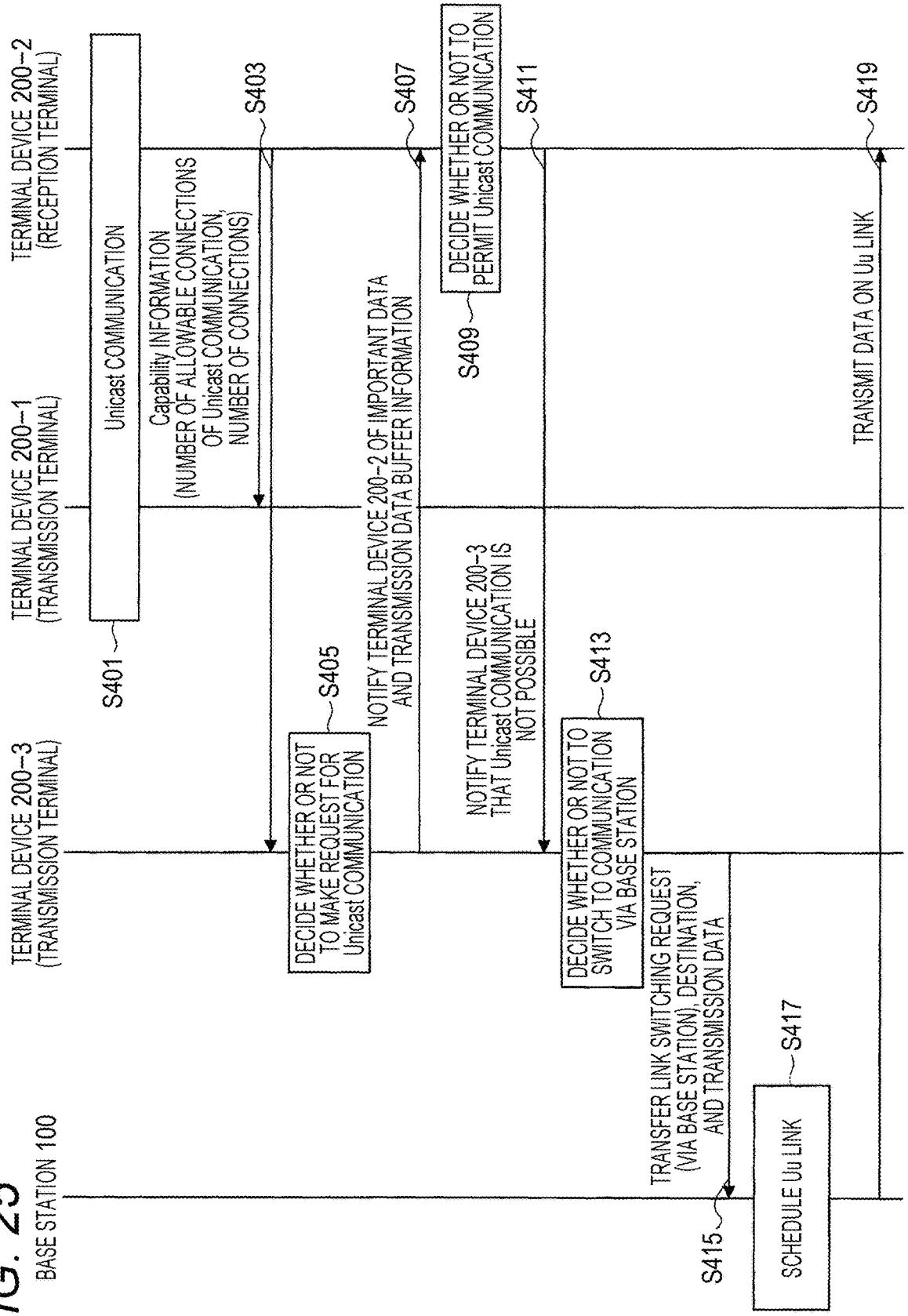
FIG. 25 is a sequence diagram illustrating an example of a flow of a series of processing of a system according to Example 3.

5.3.3. Example 3: Third Example of Operation Related to Addition of Unicast Link Next, as Example 3, another example of a flow of processing for newly adding a unicast link in inter-terminal communication via a sidelink will be described. For example, FIG. 25 is a sequence diagram illustrating an example of a flow of a series of processing of a system according to Example 3. Specifically, in the example illustrated in FIG. 25, similarly to the example illustrated in FIG. 21, while a terminal device 200-1 (transmission terminal) and a terminal device 200-2 (reception terminal) are performing unicast communication (S251), a terminal device 200-3 (transmission terminal) is trying to newly set a unicast link with the terminal device 200-2 (reception terminal). Note that processing illustrated by reference numerals S401 to S407 in FIG. 25 are substantially similar to the processing illustrated by reference numerals S201 to S207 in the example illustrated in FIG. 21, and a detailed description thereof will thus be omitted.

If the terminal device 200-2 receives the request for the unicast communication from the terminal device 200-3, the terminal device 200-2 decides whether or not to permit the unicast communication for the terminal device 200-3 on the basis of the information notification of which is provided together (S409). Note that in the example illustrated in FIG. 25, an example of a case where the terminal device 200-2 preferentially communicates with the terminal device 200-1 over the terminal device 200-3 is illustrated. Therefore, the terminal device 200-2 notifies the terminal device 200-3 that the unicast communication is not possible (S411).

The terminal device 200-3 recognizes that unicast transmission of the sidelink is not possible for the terminal device 200-2 by receiving a notification indicating that the unicast communication is not possible from the terminal device 200-2. In this case, the terminal device 200-3 decides whether or not to switch to communication via the base station 100 (communication via a Uu link) (S413). Note that in the example illustrated in FIG. 25, an example of a case where the terminal device 200-3 has decided to switch communication with the terminal device 200-2 to the communication via the base station 100 is illustrated.

Specifically, in the example illustrated in FIG. 25, the terminal device 200-3 requests the base station 100 to switch the communication with the terminal device 200-2 to Uu link communication. At this time, the terminal device 200-3 transmits data scheduled to be transmitted to the terminal device 200-2 and destination information of the data (that is, information of the terminal device 200-2) to the base station 100 (S415).

The base station 100 receives the request from the terminal device 200-3 and schedules communication between the terminal device 200-3 and the terminal device 200-2 via the Uu link (S417). Then, the base station 100 transfers the data transmitted from the terminal device 200-3 to the terminal device 200-2 on the basis of the destination information notification of which is provided from the terminal device 200-3 (S419).

As Example 3, another example of a flow of processing for newly adding a unicast link in inter-terminal communication via a sidelink has been described with reference to FIG. 25 hereinabove.

6. Application Example

The technology according to the present disclosure can be applied to various products. For example, the base station 100 may be realized as any type of evolved Node B (eNB) such as a macro eNB, a small eNB, or the like. The small eNB may be an eNB that covers a cell smaller than a macro cell, such as a pico eNB, a micro eNB, a home (femto) eNB, or the like. Instead, the base station 100 may be realized as another type of base station such as a Node B, a base transceiver station (BTS), or the like. The base station 100 may include a main body (also referred to as a base station device) that controls wireless communication and one or more remote radio heads (RRHs) that are arranged at places different from the main body. Furthermore, various types of terminals as described later may operate as the base station 100 by temporarily or semi-permanently executing a base station function.

Furthermore, for example, the terminal device 200 or 300 may be realized as a smartphone, a tablet personal computer (PC), a laptop PC, a portable game terminal, a mobile terminal such as a portable/dongle-type mobile router, a digital camera or the like, or an in-vehicle terminal such as a car navigation device or the like. Furthermore, the terminal device 200 or 300 may be realized as a terminal (also referred to as a machine type communication (MTC) terminal) that performs machine to machine (M2M) communication. Moreover, the terminal device 200 or 300 may be a wireless communication module (for example, an integrated circuit module configured by one base station 100 die) that is mounted on these terminals.

6.1. Application Example Related to Base Station

First Application Example

Figure 26:
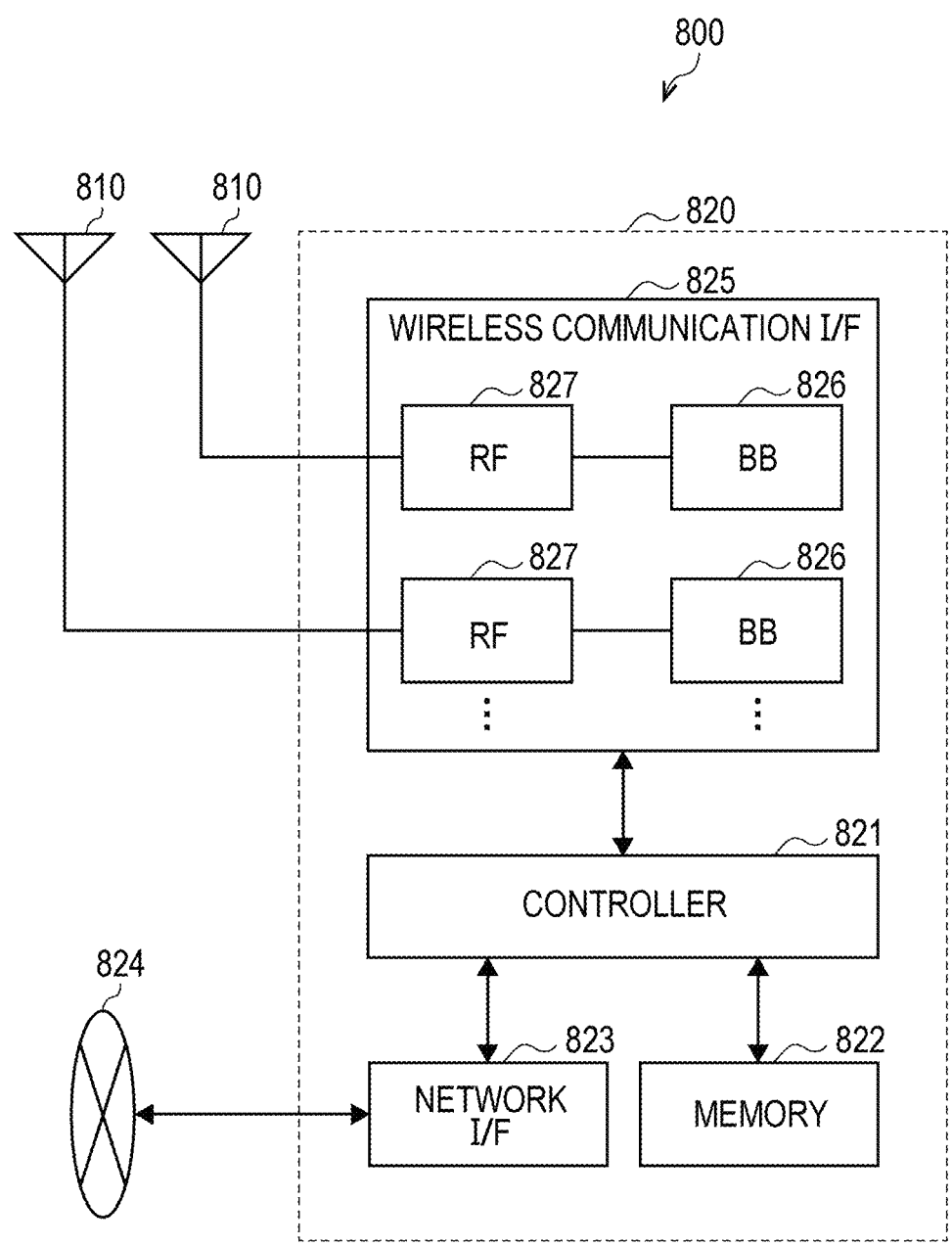
FIG. 26 is a block diagram illustrating a first example of a schematic configuration of an eNB.

FIG. 26 is a block diagram illustrating a first example of a schematic configuration of an eNB to which the technology according to the present disclosure can be applied. The eNB 800 includes one or more antennas 810 and a base station device 820. Each antenna 810 and the base station device 820 can be connected to each other via a radio frequency (RF) cable.

Each of the antennas 810 has a single or a plurality of antenna elements (for example, a plurality of antenna elements configuring a MIMO antenna), and is used to transmit and receive a radio signal by the base station device 820. The eNB 800 includes a plurality of antennas 810 as illustrated in FIG. 26, and the plurality of antennas 810 may correspond to, for example, a plurality of frequency bands used by the eNB 800, respectively. Note that an example in which the eNB 800 includes the plurality of antennas 810 has been illustrated in FIG. 26, but the eNB 800 may include a single antenna 810.

The base station device 820 includes a controller 821, a memory 822, a network interface 823, and a wireless communication interface 825.

The controller 821 may be, for example, a central processing unit (CPU) or a digital signal processor (DSP) and operates various functions of an upper layer of the base station device 820. For example, the controller 821 generates a data packet from data in a signal processed by the wireless communication interface 825 and transfers the generated data packet via the network interface 823. The controller 821 may generate a bundled packet by bundling data from a plurality of baseband processors and transfer the generated bundled packet. Furthermore, the controller 821 may have a logical function of executing control such as radio resource control, radio bearer control, mobility management, admission control, scheduling, or the like. Furthermore, the control may be executed in cooperation with a peripheral eNB or a core network node. The memory 822 includes a random access memory (RAM) and a read only memory (ROM), and stores a program executed by the controller 821 and various control data (for example, terminal list, transmission power data, scheduling data, and the like).

The network interface 823 is a communication interface for connecting the base station device 820 to a core network 824. The controller 821 may communicate with the core network node or another eNBs via the network interface 823. In that case, the eNB 800 and the core network node or another eNB may be connected to each other by a logical interface (for example, an S1 interface or an X2 interface). The network interface 823 may be a wired communication interface or a wireless communication interface for a wireless backhaul. In a case where the network interface 823 is the wireless communication interface, the network interface 823 may use a frequency band higher than a frequency band used by the wireless communication interface 825 for wireless communication.

The wireless communication interface 825 supports any one cellular communication mode such as long term evolution (LTE), LTE-Advanced or the like, and provides a wireless connection to a terminal located in a cell of the eNB 800 via the antenna 810. The wireless communication interface 825 can typically include a baseband (BB) processor 826, a radio frequency (RF) circuit 827, and the like. The BB processor 826 may execute, for example, coding/decoding, modulation/demodulation, multiplexing/demultiplexing, and the like, and executes various signal processing of each layer (for example, L1, medium access control (MAC), radio link control (RLC), and packet data convergence protocol (PDCP)). The BB processor 826 may have some or all of the logical functions described above instead of the controller 821. The BB processor 826 may be a module including a memory that stores a communication control program, a processor that executes the communication control program, and a related circuit, and a function of the BB processor 826 may be changeable by updating the communication control program. Furthermore, the module may be a card or a blade inserted into a slot of the base station device 820 or may be a chip mounted on the card or the blade. Meanwhile, the RF circuit 827 may include a mixer, a filter, an amplifier, and the like, and transmits and receives a radio signal via the antenna 810.

The wireless communication interface 825 includes a plurality of BB processors 826 as illustrated in FIG. 26, and the plurality of BB processors 826 may correspond to, for example, the plurality of frequency bands used by the eNB 800, respectively. Furthermore, the wireless communication interface 825 includes a plurality of RF circuits 827 as illustrated in FIG. 26, and the plurality of RF circuits 827 may correspond to, for example, the plurality of antenna elements, respectively. Note that an example in which the wireless communication interface 825 includes the plurality of BB processors 826 and the plurality of RF circuits 827 has been illustrated in FIG. 26, but the wireless communication interface 825 may include a single BB processor 826 or a single RF circuit 827.

In the eNB 800 illustrated in FIG. 26, one or more components (for example, at least one of the communication control unit 151, the information acquisition unit 153, or the notification unit 155) included in the base station 100 described with reference to FIG. 2 may be implemented in the wireless communication interface 825. Alternatively, at least some of these components may be implemented in the controller 821. As an example, the eNB 800 may be mounted with a module including a part (for example, the BB processor 826) or the whole of the wireless communication interface 825 and/or the controller 821, and the one or more components may be implemented in the module. In this case, the module may store a program for causing a processor to function as the one or more components (in other words, a program for causing the processor to execute operations of the one or more components), and execute the program. As another example, the program for causing the processor to function as the one or more components may be installed in the eNB 800, and the wireless communication interface 825 (for example, the BB processor 826) and/or the controller 821 may execute the program. As described above, the eNB 800, the base station device 820, or the module may be provided or the program for causing the processor to function as the one or more components may be provided, as a device including the one or more components. Furthermore, a readable recording medium on which the program is recorded may be provided.

Furthermore, in the eNB 800 illustrated in FIG. 26, the wireless communication unit 120 described with reference to FIG. 2 may be implemented in the wireless communication interface 825 (for example, the RF circuit 827). Furthermore, the antenna unit 110 may be implemented in the antenna 810. Furthermore, the network communication unit 130 may be implemented in the controller 821 and/or the network interface 823. Furthermore, the storage unit 140 may be implemented in the memory 822.

Second Application Example

Figure 27:
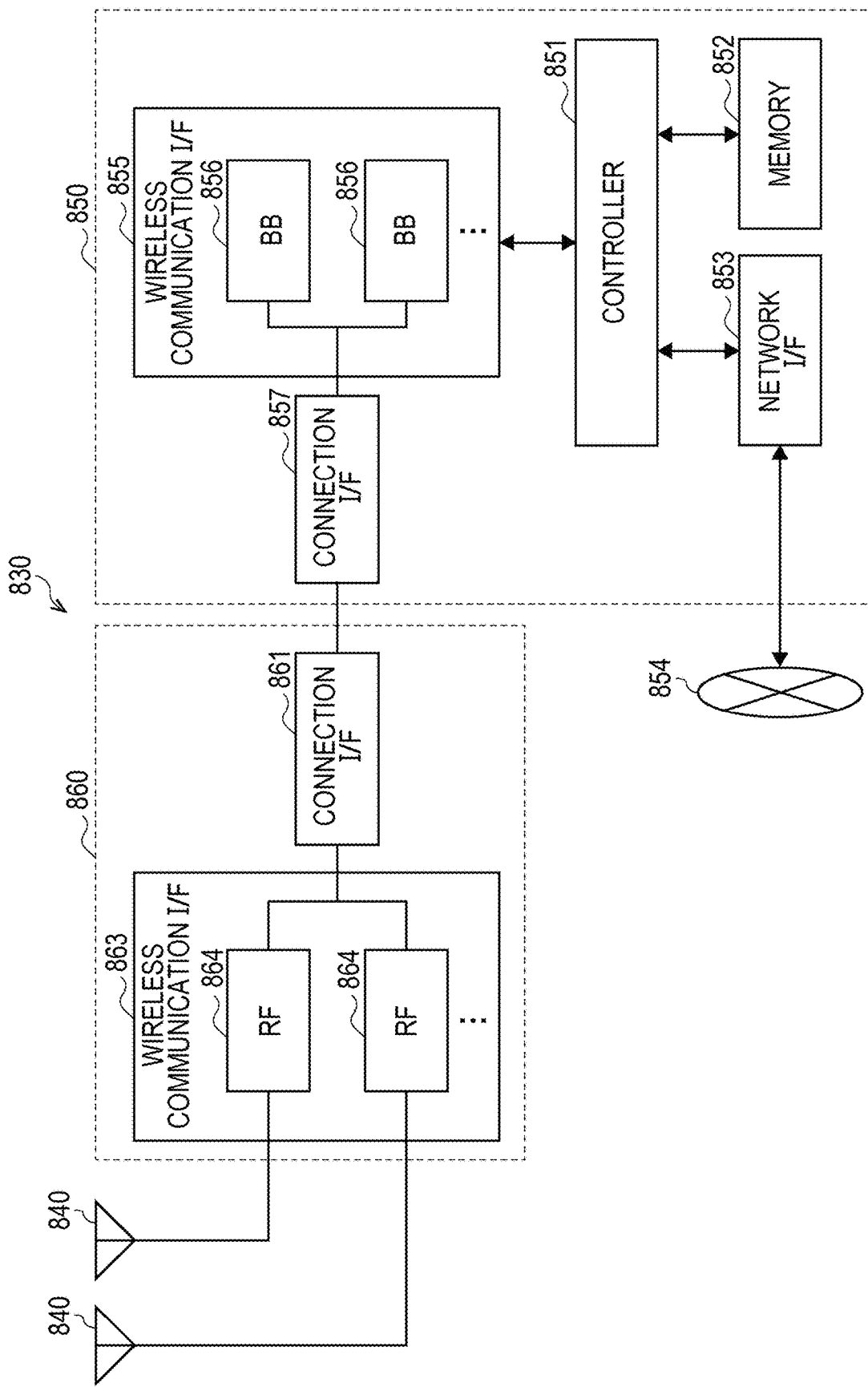
FIG. 27 is a block diagram illustrating a second example of a schematic configuration of an eNB.

FIG. 27 is a block diagram illustrating a second example of a schematic configuration of an eNB to which the technology according to the present disclosure can be applied. The eNB 830 includes one or more antennas 840, a base station device 850, and an RRH 860. Each antenna 840 and the RRH 860 can be connected to each other via an RF cable. Furthermore, the base station device 850 and the RRH 860 can be connected to each other by a high-speed line such as an optical fiber cable or the like.

Each of the antennas 840 has a single or a plurality of antenna elements (for example, a plurality of antenna elements configuring a MIMO antenna), and is used to transmit and receive a radio signal by the RRH 860. The eNB 830 includes a plurality of antennas 840 as illustrated in FIG. 27, and the plurality of antennas 840 may correspond to, for example, a plurality of frequency bands used by the eNB 830, respectively. Note that an example in which the eNB 830 includes the plurality of antennas 840 has been illustrated in FIG. 27, but the eNB 830 may include a single antenna 840.

The base station device 850 includes a controller 851, a memory 852, a network interface 853, a wireless communication interface 855, and a connection interface 857. The controller 851, the memory 852, and the network interface 853 are similar to the controller 821, the memory 822, and the network interface 823 described with reference to FIG. 26, respectively.

The wireless communication interface 855 supports any one cellular communication mode such as LTE, LTE-Advanced, or the like, and provides a wireless connection to a terminal located in a sector corresponding to the RRH 860 via the RRH 860 and the antenna 840. The wireless communication interface 855 may typically include a BB processor 856 and the like. The BB processor 856 is similar to the BB processor 826 described with reference to FIG. 26 except that it is connected to an RF circuit 864 of the RRH 860 via the connection interface 857. The wireless communication interface 855 includes a plurality of BB processors 856 as illustrated in FIG. 27, and the plurality of BB processors 856 may correspond to, for example, the plurality of frequency bands used by the eNB 830, respectively. Note that an example in which the wireless communication interface 855 includes the plurality of BB processors 856 has been illustrated in FIG. 27, but the wireless communication interface 855 may include a single BB processor 856.

The connection interface 857 is an interface for connecting the base station device 850 (wireless communication interface 855) to the RRH 860. The connection interface 857 may be a communication module for communication on the high-speed line connecting the base station device 850 (wireless communication interface 855) and the RRH 860 to each other.

Furthermore, the RRH 860 also includes a connection interface 861 and a wireless communication interface 863.

The connection interface 861 is an interface for connecting the RRH 860 (wireless communication interface 863) to the base station device 850. The connection interface 861 may be a communication module for communication on the high-speed line.

The wireless communication interface 863 transmits and receives a radio signal via the antenna 840. The wireless communication interface 863 may typically include an RF circuit 864 and the like. The RF circuit 864 may include a mixer, a filter, an amplifier, and the like, and transmits and receives a radio signal via the antenna 840. The wireless communication interface 863 includes a plurality of RF circuits 864 as illustrated in FIG. 27, and the plurality of RF circuits 864 may correspond to, for example, the plurality of antenna elements, respectively. Note that an example in which the wireless communication interface 863 includes the plurality of RF circuits 864 has been illustrated in FIG. 27, but the wireless communication interface 863 may include a single RF circuit 864.

In the eNB 830 illustrated in FIG. 27, one or more components (for example, at least one of the communication control unit 151, the information acquisition unit 153, or the notification unit 155) included in the base station 100 described with reference to FIG. 2 may be implemented in the wireless communication interface 855 and/or the wireless communication interface 863. Alternatively, at least some of these components may be implemented in the controller 851. As an example, the eNB 830 may be mounted with a module including a part (for example, the BB processor 856) or the whole of the wireless communication interface 855 and/or the controller 851, and the one or more components may be implemented in the module. In this case, the module may store a program for causing a processor to function as the one or more components (in other words, a program for causing the processor to execute operations of the one or more components), and execute the program. As another example, the program for causing the processor to function as the one or more components may be installed in the eNB 830, and the wireless communication interface 855 (for example, the BB processor 856) and/or the controller 851 may execute the program. As described above, the eNB 830, the base station device 850, or the module may be provided or the program for causing the processor to function as the one or more components may be provided, as a device including the one or more components. Furthermore, a readable recording medium on which the program is recorded may be provided.

Furthermore, in the eNB 830 illustrated in FIG. 27, for example, the wireless communication unit 120 described with reference to FIG. 2 may be implemented in the wireless communication interface 863 (for example, the RF circuit 864). Furthermore, the antenna unit 110 may be implemented in the antenna 840. Furthermore, the network communication unit 130 may be implemented in the controller 851 and/or the network interface 853.

Furthermore, the storage unit 140 may be implemented in the memory 852.

6.2. Application Example Related to Terminal Device

First Application Example

Figure 28:
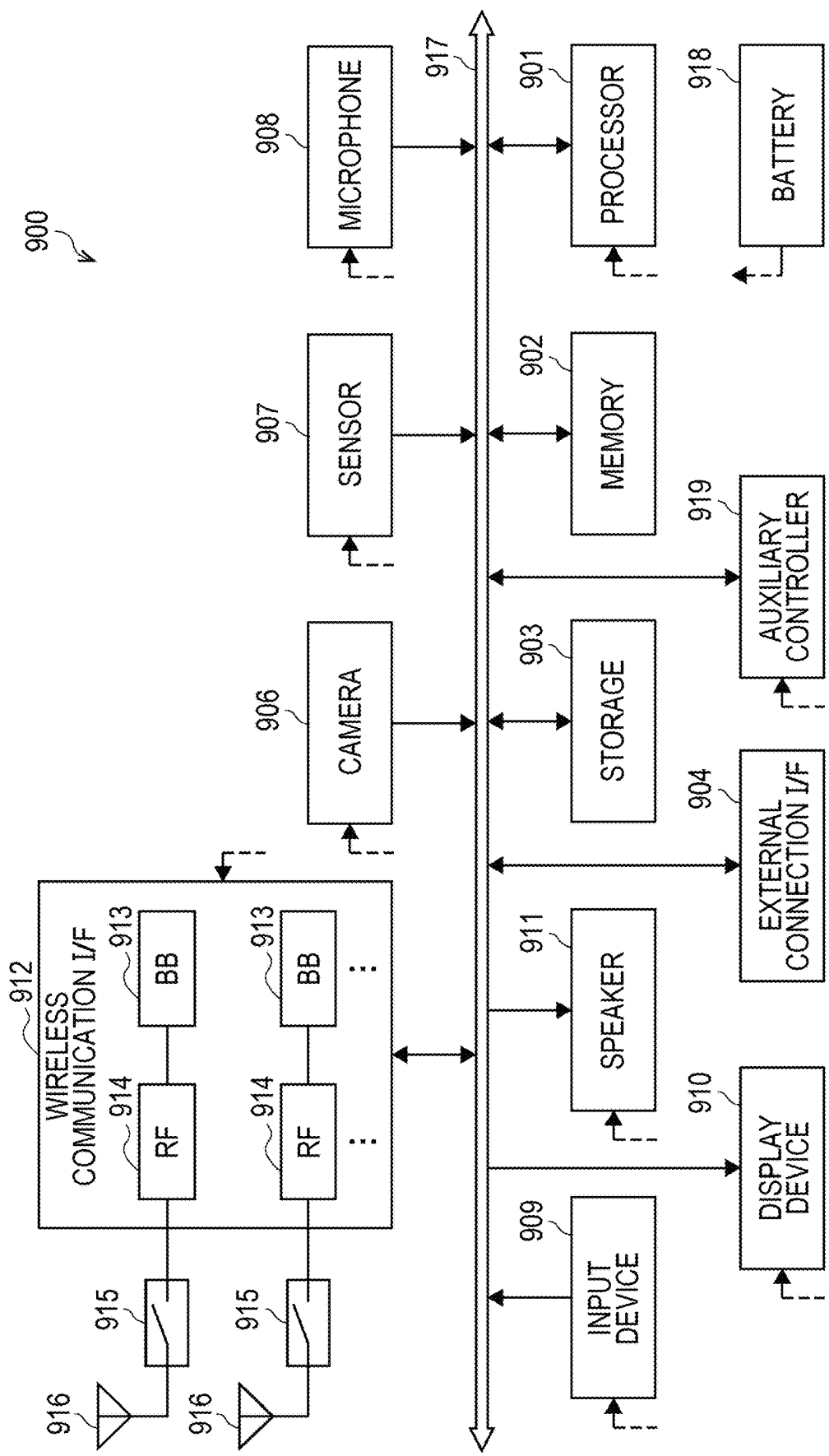
FIG. 28 is a block diagram illustrating an example of a schematic configuration of a smartphone.

FIG. 28 is a block diagram illustrating an example of a schematic configuration of a smartphone 900 to which the technology according to the present disclosure can be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on chip (SoC), and controls functions of an application layer and other layers of the smartphone 900. The memory 902 includes a RAM and a ROM, and stores a program executed by the processor 901 and data. The storage 903 can include a storage medium such as a semiconductor memory, a hard disk, or the like. The external connection interface 904 is an interface for connecting an externally attached device such as a memory card, a universal serial bus (USB) device, or the like to the smartphone 900.

The camera 906 includes, for example, an imaging element such as a charge coupled device (CCD), a complementary metal oxide semiconductor (CMOS), or the like, and generates a captured image. The sensor 907 can include a sensor group such as, for example, a positioning sensor, a gyro sensor, a geomagnetic sensor, an acceleration sensor, and the like. The microphone 908 converts a sound input into the smartphone 900 to an audio signal. The input device 909 includes, for example, a touch sensor that detects a touch on a screen of the display device 910, a keypad, a keyboard, a button, a switch, or the like, and accepts an operation or an information input from a user. The display device 910 includes a screen such as a liquid crystal display (LCD), an organic light emitting diode (OLED) display, or the like, and displays an output image of the smartphone 900. The speaker 911 converts an audio signal output from the smartphone 900 to a sound.

The wireless communication interface 912 supports any one cellular communication mode such as LTE, LTE-Advanced, or the like, and executes wireless communication. The wireless communication interface 912 can typically include a BB processor 913, an RF circuit 914, and the like. The BB processor 913 may perform, for example, coding/decoding, modulation/demodulation, multiplexing/demultiplexing, and the like, and performs various signal processing for wireless communication. Meanwhile, the RF circuit 914 may include a mixer, a filter, an amplifier, and the like, and transmits and receives a radio signal via the antenna 916. The wireless communication interface 912 may be a one-chip module in which the BB processor 913 and the RF circuit 914 are integrated. The wireless communication interface 912 may include a plurality of BB processors 913 and a plurality of RF circuits 914 as illustrated in FIG. 28. Note that an example in which the wireless communication interface 912 includes the plurality of BB processors 913 and the plurality of RF circuits 914 has been illustrated in FIG. 28, but the wireless communication interface 912 may include a single BB processor 913 or a single RF circuit 914.

Moreover, the wireless communication interface 912 may support other types of wireless communication modes such as a short-range wireless communication mode, a near field wireless communication mode, a wireless local area network (LAN) mode, or the like, in addition to the cellular communication mode. In that case, the wireless communication interface 912 may include the BB processor 913 and the RF circuit 914 for every wireless communication mode.

Each of the antenna switches 915 switches a connection destination of the antenna 916 among a plurality of circuits (for example, circuits for different wireless communication modes) included in the wireless communication interface 912.

Each of the antennas 916 has a single or a plurality of antenna elements (for example, a plurality of antenna elements configuring a MIMO antenna), and is used to transmit and receive a radio signal by the wireless communication interface 912. The smartphone 900 may include a plurality of antennas 916 as illustrated in FIG. 28. Note that an example in which the smartphone 900 includes the plurality of antennas 916 has been illustrated in FIG. 28, but the smartphone 900 may include a single antenna 916.

Moreover, the smartphone 900 may include the antenna 916 for every wireless communication mode. In that case, the antenna switch 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies power to each block of the smartphone 900 illustrated in FIG. 28 via feeding lines partially illustrated as broken lines in FIG. 28. The auxiliary controller 919 operates a minimum necessary function of the smartphone 900 in, for example, a sleep mode.

In the smartphone 900 illustrated in FIG. 28, one or more components (for example, at least one of the communication control unit 241, the information acquisition unit 243, or the notification unit 247) included in the terminal device 200 described with reference to FIG. 3 may be implemented in the wireless communication interface 912. Alternatively, at least some of these components may be implemented in the processor 901 or the auxiliary controller 919. As an example, the smartphone 900 may be mounted with a module including a part (for example, the BB processor 913) or the whole of the wireless communication interface 912, the processor 901, and/or the auxiliary controller 919, and the one or more components may be implemented in the module. In this case, the module may store a program for causing a processor to function as the one or more components (in other words, a program for causing the processor to execute operations of the one or more components), and execute the program. As another example, the program for causing the processor to function as the one or more components may be installed in the smartphone 900, and the wireless communication interface 912 (for example, the BB processor 913), the processor 901, and/or the auxiliary controller 919 may execute the program. As described above, the smartphone 900 or the module may be provided or the program for causing the processor to function as the one or more components may be provided, as a device including the one or more components. Furthermore, a readable recording medium on which the program is recorded may be provided.

Furthermore, in the smartphone 900 illustrated in FIG. 28, for example, the wireless communication unit 220 described with reference to FIG. 3 may be implemented in the wireless communication interface 912 (for example, the RF circuit 914). Furthermore, the antenna unit 210 may be implemented in the antenna 916. Furthermore, the storage unit 230 may be implemented in the memory 902.

Second Application Example

Figure 29:
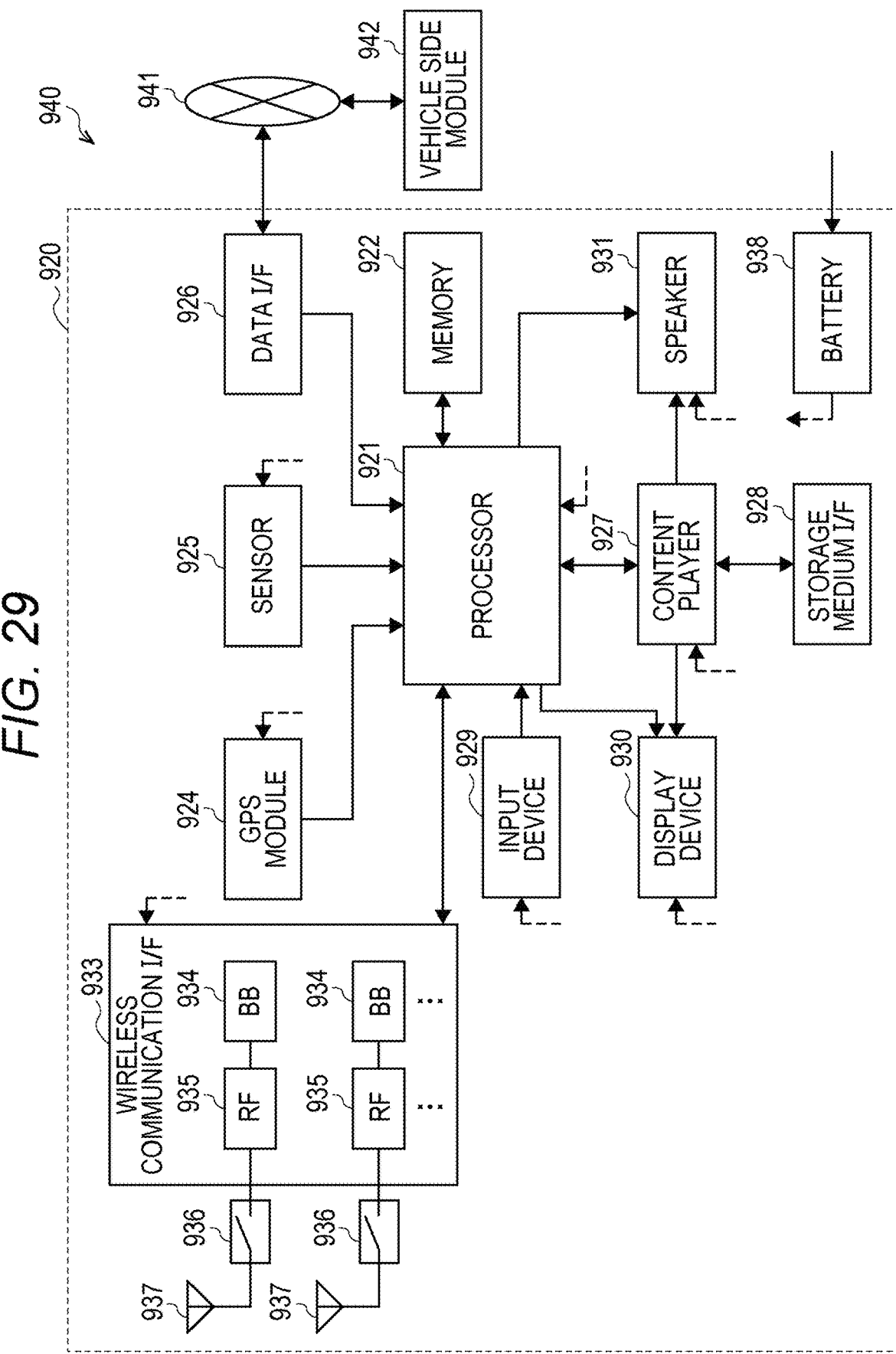
FIG. 29 is a block diagram illustrating an example of a schematic configuration of a car navigation device.

FIG. 29 is a block diagram illustrating an example of a schematic configuration of a car navigation device 920 to which the technology according to the present disclosure can be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or a SoC, and controls a navigation function and the other functions of the car navigation device 920. The memory 922 includes a RAM and a ROM, and stores a program executed by the processor 921 and data.

The GPS module 924 measures a position (for example, a latitude, a longitude, and an altitude) of the car navigation device 920 using a GPS signal received from a GPS satellite. The sensor 925 can include a sensor group such as, for example, a gyro sensor, a geomagnetic sensor, a barometric sensor, and the like. The data interface 926 is, for example, connected to an in-vehicle network 941 via a terminal (not illustrated), and acquires data such as vehicle speed data or the like generated on a vehicle side.

The content player 927 plays a content stored in a storage medium (for example, a compact disk (CD) or a digital versatile disk (DVD)) inserted into the storage medium interface 928. The input device 929 includes, for example, a touch sensor that detects a touch on a screen of the display device 930, a button, a switch, or the like, and accepts an operation or an information input from a user. The display device 930 includes a screen such as an LCD, an OLED display, or the like, and displays an image of a navigation function or the played content. The speaker 931 outputs a sound of the navigation function or the played content.

The wireless communication interface 933 supports any one cellular communication mode such as LTE, LTE-Advanced, or the like, and executes wireless communication. The wireless communication interface 933 can typically include a BB processor 934, an RF circuit 935, and the like. The BB processor 934 may perform, for example, coding/decoding, modulation/demodulation, multiplexing/demultiplexing, and the like, and performs various signal processing for wireless communication. Meanwhile, the RF circuit 935 may include a mixer, a filter, an amplifier, and the like, and transmits and receives a radio signal via the antenna 937. The wireless communication interface 933 may be a one-chip module in which the BB processor 934 and the RF circuit 935 are integrated. The wireless communication interface 933 may include a plurality of BB processors 934 and a plurality of RF circuits 935 as illustrated in FIG. 29. Note that an example in which the wireless communication interface 933 includes the plurality of BB processors 934 and the plurality of RF circuits 935 has been illustrated in FIG. 29, but the wireless communication interface 933 may include a single BB processor 934 or a single RF circuit 935.

Moreover, the wireless communication interface 933 may support other types of wireless communication modes such as a short-range wireless communication mode, a near field wireless communication mode, a wireless LAN mode, or the like, in addition to the cellular communication mode. In that case, the wireless communication interface 933 may include the BB processor 934 and the RF circuit 935 for every wireless communication mode.

Each of the antenna switches 936 switches a connection destination of the antenna 937 among a plurality of circuits (for example, circuits for different wireless communication modes) included in the wireless communication interface 933.

Each of the antennas 937 has a single or a plurality of antenna elements (for example, a plurality of antenna elements configuring a MIMO antenna), and is used to transmit and receive a radio signal by the wireless communication interface 933. The car navigation device 920 may include a plurality of antennas 937 as illustrated in FIG. 29. Note that an example in which the car navigation device 920 includes the plurality of antennas 937 has been illustrated in FIG. 29, but the car navigation device 920 may include a single antenna 937.

Moreover, the car navigation device 920 may include an antenna 937 for every wireless communication mode. In that case, the antenna switch 936 may be omitted from the configuration of the car navigation device 920.

The battery 938 supplies power to each block of the car navigation device 920 illustrated in FIG. 29 via a feeder line partially illustrated as a broken line in FIG. 29. Furthermore, the battery 938 accumulates power supplied from the vehicle.

In the car navigation device 920 illustrated in FIG. 29, one or more components (for example, at least one of the communication control unit 241, the information acquisition unit 243, or the notification unit 247) included in the terminal device 200 described with reference to FIG. 3 may be implemented in the wireless communication interface 933. Alternatively, at least some of these components may be implemented in the processor 921. As an example, the car navigation device 920 may be mounted with a module including a part (for example, the BB processor 934) or the whole of the wireless communication interface 933 and/or the processor 921, and the one or more components may be implemented in the module. In this case, the module may store a program for causing a processor to function as the one or more components (in other words, a program for causing the processor to execute operations of the one or more components), and execute the program. As another example, the program for causing the processor to function as the one or more components may be installed in the car navigation device 920, and the wireless communication interface 933 (for example, the BB processor 934) and/or the processor 921 may execute the program. As described above, the car navigation device 920 or the module may be provided or the program for causing the processor to function as the one or more components may be provided, as a device including the one or more components. Furthermore, a readable recording medium on which the program is recorded may be provided.

Furthermore, in the car navigation device 920 illustrated in FIG. 29, for example, the wireless communication unit 220 described with reference to FIG. 3 may be implemented in the wireless communication interface 933 (for example, the RF circuit 935). Furthermore, the antenna unit 210 may be implemented in the antenna 937. Furthermore, the storage unit 230 may be implemented in the memory 922.

Furthermore, the technology according to the present disclosure may also be realized as an in-vehicle system (or a vehicle) 940 including one or more blocks of the car navigation device 920 described above, the in-vehicle network 941, and a vehicle side module 942. The vehicle side module 942 generates vehicle side data such as a vehicle speed, an engine speed, trouble information, or the like, and outputs the generated data to the in-vehicle network 941.

6. End

As described above, in the system according to the embodiment of the present disclosure, a communication device corresponding to a reception terminal among communication devices (terminal devices 200) that perform inter-device communication includes a communication unit that performs wireless communication, an acquisition unit that acquires information from a first communication device, and a control unit that controls communication with the another communication device. Specifically, the acquisition unit acquires first information regarding a transmission condition of data using a communication mode of switching transmission and reception in a time division manner to perform the inter-device communication, from another communication device via the wireless communication. Furthermore, the control unit controls an operation related to reception of data transmitted from the another communication device according to the first information. Furthermore, a communication device corresponding to a transmission terminal includes a communication unit that performs wireless communication, a notification unit that notifies another communication device of information, and a control unit that controls communication with the another communication device. Specifically, the notification unit notifies another communication device of first information regarding a transmission condition of data using a communication mode of switching transmission and reception in a time division manner to perform the inter-device communication, via the wireless communication. Furthermore, the control unit controls an operation related to transmission of data to the another communication device after the notification of the first information.

With the configuration as described above, according to the system according to the embodiment of the present disclosure, it becomes possible to further suppress emergence of an HD problem as compared with conventional V2X communication, even under a situation in which the unicast communication is supported in the inter-device communication such as the V2X communication.

Hereinabove, the preferred embodiments of the present disclosure have been described in detail with reference to the accompanying drawings, but a technical scope of the present disclosure is not limited to such examples. It will be apparent to those skilled in the art of the present disclosure that various modifications or alterations can be conceived within the scope of the technical idea described in the claims, and it is naturally understood that these modifications or alterations also fall within the technical scope of the present disclosure.

As a specific example, the technology according to the present disclosure can be applied not only to V2X communication but also to so-called communication between terminal devices such as communication via a sidelink. Specific examples of the communication include device to device (D2D) communication, MTC communication, and the like. Furthermore, the technology according to the present disclosure can also be applied to so-called moving cells, relay communication, or the like. Furthermore, the description has been provided mainly focusing on the Mode4 resource allocation mode in the above, but the technology according to the present disclosure may be applied to the Mode3 resource allocation mode. Furthermore, as described above, a mode for an FDM type resource pool has been mainly described, but the technology according to the present disclosure can also be applied to a TDM type resource pool. Note that in this case, for example, in parts where a frequency direction and a time direction are described, the frequency direction and the time direction will be appropriately replaced with each other. Furthermore, the technology according to the present disclosure may be applied to multi-carrier communication in which sidelink communication is performed using a plurality of carriers. Furthermore, the technology according to the present disclosure can also be applied to non-ground station communication using a satellite, a drone, or the like as a device such as a base station or the like. Furthermore, the technology according to the present disclosure may be applied to sidelink communication in relay communication such as integrated access and backhaul link (IAB). Furthermore, the technology according to the present disclosure may also be applied to a use case of vehicle tethering in which a vehicle is located between a base station and a user terminal around the vehicle to become a relay terminal. In this case, for example, a communication link between the vehicle and the user terminal around the vehicle may be established by a sidelink, and the technology related to the present disclosure may be applied.

Furthermore, the effects described in the present specification are merely illustrative or exemplary rather than being restrictive. That is, the technology according to the present disclosure can accomplish other effects apparent to those skilled in the art from the description of the present specification, in addition to or instead of the effects described above.

Note that the following configurations also fall within the technical scope of the present disclosure.

(1)

A communication device including:
- a communication unit that performs wireless communication;
- an acquisition unit that acquires first information from a first communication device via the wireless communication, the first information being information regarding a transmission condition of data using a communication mode of switching transmission and reception in a time division manner to perform inter-device communication; and
- a control unit that controls an operation related to reception of data transmitted from the first communication device according to the first information.

(2)

The communication device according to the above (1), in which the control unit controls an operation related to transmission of data to a second communication device according to the first information and a situation regarding transmission or reception of data in the communication mode.

(3)

The communication device according to the above (2), in which the control unit drops a packet scheduled to be transmitted to the second communication device according to the first information and the situation regarding the transmission or the reception of the data in the communication mode.

(4)

The communication device according to the above (3), in which the control unit drops the packet scheduled to be transmitted to the second communication device on the basis of a comparison between a priority of a packet transmitted from the first communication device according to the first information and a priority of the packet scheduled to be transmitted to the second communication device.

(5)

The communication device according to the above (2), in which the control unit releases a unicast radio link established with the second communication device according to the first information and the situation regarding the transmission or the reception of the data in the communication mode.

(6)

The communication device according to any one of the above (2) to (5), in which the acquisition unit acquires second information including at least information regarding the presence or absence of important data, the information regarding the presence or absence of important data notification of which being provided via a first partial area of an area to which resources are allocated and being included in the first information, and the control unit determines whether or not to receive the data transmitted from the first communication device on the basis of the second information.

(7)

The communication device according to the above (6), in which the second information includes information regarding a second partial area different from the first partial area, and the acquisition unit acquires another piece of information notification of which is provided via the second partial area and other than information notification of which is provided as the second information among the first information on the basis of the second information.

(8)

The communication device according to the above (6) or (7), in which the control unit determines whether to prioritize the reception of the data transmitted from the first communication device or the transmission of the data to the second communication device on the basis of the second information.

(9)

The communication device according to any one of the above (1) to (8), in which the control unit controls a path related to the reception of the data transmitted from the first communication device according to the first information and the situation regarding the transmission or the reception of the data in the communication mode.

(10)

The communication device according to any one of the above (1) to (9), in which the control unit determines whether or not to permit transmission of the data for the first communication device on the basis of the first information, and performs control so that the data transmitted from the first communication device is received according to a result of the determination.

(11)

The communication device according to the above (10), further including a notification unit that notifies the first communication device of information according to the result of determination as to whether or not to permit the transmission of the data for the first communication device, in which the control unit performs control so that the data transmitted from the first communication device is received after the notification of the information according to the result of the determination.

(12)

The communication device according to any one of the above (1) to (11), further including a notification unit that notifies the first communication device of third information regarding the reception of the data, in which the acquisition unit acquires the first information from the first communication device after the notification of the third information.

(13)

The communication device according to the above (12), in which the third information includes at least one of information regarding the number of receiving antennas, information regarding a device related to the reception of the data, information regarding a resource pool available for the reception of the data, information regarding processing related to transmission of the data, information regarding processing related to the reception of the data, or information regarding a resource capable of receiving the data.

(14)

The communication device according to any one of the above (1) to (13), in which the first information includes at least one of information regarding a buffer of transmission data in the first communication device, information regarding a schedule of future transmission by the first communication device, information regarding a type of packet related to transmission of the data, information regarding a reception period of packet related to the transmission of the data, information regarding a priority of packet related to the transmission of the data, or information regarding the presence or absence of important data.

(15)

The communication device according to any one of the above (1) to (14), further including a notification unit that notifies the first communication device of information regarding a resource capable of receiving the data.

(16)

A communication device including:

a communication unit that performs wireless communication;

a notification unit that notifies a third communication device of first information via the wireless communication, the first information being information regarding a transmission condition of data using a communication mode of switching transmission and reception in a time division manner to perform inter-device communication; and a control unit that controls an operation related to transmission of data to the third communication device after the notification of the first information.

(17)

The communication device according to the above (16), in which the control unit controls a priority between the transmission of the data to the third communication device and reception of data transmitted from a fourth communication device according to a predetermined condition, after the notification of the first information.

(18)

The communication device according to the above (17), in which the control unit controls the priority on the basis of at least one of
- a type of communication traffic,
- position information of at least one of the communication device, the third communication device, or the fourth communication device,
- a channel busy ratio, or
- a channel occupancy ratio.

(19)

The communication device according to any one of the above (16) to (18), in which the control unit drops a packet scheduled to be transmitted to the third communication device according to a predetermined condition, after the notification of the first information.

(20)

The communication device according to any one of the above (16) to (19), in which the control unit controls a transmission method of a packet scheduled to be transmitted to the third communication device according to a predetermined condition, after the notification of the first information.

(21)

The communication device according to any one of the above (16) to (20), in which the notification unit instructs the third communication device to release a unicast radio link with another communication device according to a predetermined condition, after the notification of the first information.

(22)

The communication device according to any one of the above (16) to (21), in which the control unit switches communication with the third communication device to multi-carrier communication according to a predetermined condition, after the notification of the first information.

(23)

The communication device according to any one of the above (16) to (22), in which the control unit controls a frequency band used for communication with the third communication device according to a predetermined condition, after the notification of the first information.

(24)

The communication device according to any one of the above (16) to (23), in which the control unit controls a transmission path of the data to the third communication device according to a predetermined condition, after the notification of the first information.

(25)

The communication device according to any one of the above (16) to (24), in which the control unit performs reservation of a resource for the third communication device to receive a packet according to a predetermined condition, after the notification of the first information.

(26)

The communication device according to any one of the above (16) to (25), in which the control unit drops a packet scheduled to be transmitted to the third communication device on the basis of a comparison result between a priority of the packet scheduled to be transmitted to the third communication device and a priority related to reception of a packet in the third communication device, after the notification of the first information.

(27)

A communication device including:
- a communication unit that performs wireless communication;
- an acquisition unit that acquires first information from a first communication device via the wireless communication, the first information being information regarding a transmission condition of data using a communication mode of switching transmission and reception in a time division manner to perform inter-device communication; and
- a control unit that controls an operation related to reception of data transmitted from the first communication device according to the first information.

(28)

A communication device including:
- a communication unit that performs wireless communication;
- a notification unit that notifies a third communication device of first information via the wireless communication, the first information being information regarding a transmission condition of data using a communication mode of switching transmission and reception in a time division manner to perform inter-device communication; and
- a control unit that controls an operation related to transmission of data to the third communication device after the notification of the first information.

REFERENCE SIGNS LIST

1 System
100 Base station
110 Antenna unit
120 Wireless communication unit
130 Network communication unit
140 Storage unit
150 Control unit
151 Communication control unit
153 Information acquisition unit
155 Notification unit
200 Terminal device
210 Antenna unit
220 Wireless communication unit
230 Storage unit
240 Control unit
241 Communication control unit
243 Information acquisition unit
247 Notification unit

The invention claimed is:

1. A second communication device using a half duplex mode for sidelink communication, the second communication device comprising:
circuitry configured to perform sidelink communication with a first communication device, wherein the side link communication includes:
notifying the first communication device of third-first information regarding a data reception capability of the second communication device using the half duplex mode, the first information being notified by first Sidelink Control Information (SCI), wherein the first information includes information regarding a time frequency domain of a resource available to the second communication device for receiving data to be transmitted from the first communication device to the second communication device;

based on the first information, acquiring, by second SCI, third information from the first communication device, the third information being information regarding the data to be transmitted from the first communication device to the second communication device by the sidelink communication, wherein the third information included in the second SCI includes:
  cast type information selected from among unicast, broadcast or multicast, and
  priority information for the data, and receiving the data which is subsequently transmitted from the first communication device to the second communication device according to the third information.

2. The second communication device according to claim 1, wherein the circuitry is further configured to:
  acquire second information including at least information regarding presence or absence of important data, the information regarding the presence or absence of important data notification of which being provided via a first partial area of an area to which resources are allocated and being included in the first information, and
  determine whether or not to receive the data transmitted from the first communication device on a basis of the second information.

3. The second communication device according to claim 1, wherein
  the second information includes information regarding a second partial area different from the first partial area, and
  the circuitry is further configured to acquire another piece of information notification of which is provided via the second partial area and other than information notification of which is provided as the second information among the first information on a basis of the second information.

4. The second communication device according to claim 2, wherein the control circuitry is further configured to determine whether to prioritize the reception of the data transmitted from the first communication device.

5. The second communication device according to claim 1, wherein the circuitry is further configured to control a path related to the reception of the data transmitted from the first communication device according to the first information.

6. The second communication device according to claim 1,
  wherein the first information further includes each of:
    information regarding the number of receiving antennas,
    information regarding a device related to the reception of the data,
    information regarding processing related to transmission of the data, and
    information regarding processing related to the reception of the data.

7. The communication device according to claim 6, wherein the third information further includes each of:
  information regarding a buffer of transmission data in the first communication device,
  information regarding a schedule of future transmission by the first communication device,
  information regarding a reception period of packet related to the transmission of the data, and
  information regarding presence or absence of important data.

8. A method of wireless communication performed by a second communication device that uses a half duplex mode for sidelink communication, the method comprising:
  performing sidelink communication with a first communication device; device, the sidelink communication comprising:
  notifying the first communication device of first information regarding a data reception capability of the second communication device using the half duplex mode, the first information being notified by first Sidelink Control Information (SCI),
  wherein the first information includes information regarding a time frequency domain of a resource available to the second communication device for receiving data to be transmitted from the first communication device to the second communication device;
  based on the first information, acquiring, by second SCI, third information from the first communication device, the third information being information regarding the data to be transmitted from the first communication device to the second communication device by the sidelink communication,
  wherein the third information included in the second SCI includes:
    cast type information selected from among unicast, broadcast or multicast, and priority information for the data, and
  receiving the data which is subsequently transmitted from the first communication device to the second communication device according to the third information.

9. A non-transitory computer product containing instructions for a method of wireless communication performed by a second communication device that uses a half duplex mode for sidelink communication, the method comprising:
  performing sidelink communication with a first communication device, the sidelink communication comprising:
  notifying the first communication device of first information regarding a data reception capability of the second communication device using the half duplex mode, the first information being notified by first Sidelink Control Information (SCI),
  wherein the first information includes information regarding a time frequency domain of a resource available to the second communication device for receiving data to be transmitted from the first communication device to the second communication device;
  based on the first information, acquiring, by second SCI, third information from the first communication device, the third information being information regarding the data to be transmitted from the first communication device to the second communication device by the sidelink communication,
  wherein the third information included in the second SCI includes:
    cast type information selected from among unicast, broadcast or multicast, and priority information for the data, and receiving the data which is subsequently transmitted from the first communication device to the second communication device according to the third information.

* * * * *